United States Patent
Sardes et al.

(10) Patent No.: US 11,827,069 B2
(45) Date of Patent: Nov. 28, 2023

(54) SLIDING PILLAR SUSPENSION SYSTEM

(71) Applicant: REE AUTOMOTIVE LTD, Glil-Yam (IL)

(72) Inventors: Ahishay Sardes, Tel Aviv (IL); Ran Dekel, Nofit (IL); Amit Aknin, Karkom (IL); Tomer Segev, Tel-Aviv (IL); Eran Starik, Tel Aviv-Jaffa (IL); Dan Hermann, Ramat Hasharon (IL); Eylon Avigur, Ramat-Gan (IL)

(73) Assignee: REE AUTOMOTIVE LTD, Glil-Yam (IL)

( * ) Notice: Subject to any disclaimer, the term of this patent is extended or adjusted under 35 U.S.C. 154(b) by 190 days.

(21) Appl. No.: 17/376,951

(22) Filed: Jul. 15, 2021

(65) Prior Publication Data
US 2021/0339590 A1 Nov. 4, 2021

Related U.S. Application Data

(63) Continuation of application No. 16/975,744, filed as application No. PCT/IL2020/050446 on Apr. 16, 2020, now Pat. No. 11,097,582.
(Continued)

(51) Int. Cl.
*B62D 5/04* (2006.01)
*B60G 3/01* (2006.01)
(Continued)

(52) U.S. Cl.
CPC .............. *B60G 3/01* (2013.01); *B60G 13/16* (2013.01); *B62D 5/0418* (2013.01);
(Continued)

(58) Field of Classification Search
CPC .. B60G 13/00; B60G 2204/4232; B60G 3/01; B60G 13/16
See application file for complete search history.

(56) References Cited

U.S. PATENT DOCUMENTS

1,984,694 A * 12/1934 Nottoli ............... B60G 11/04
267/68
3,411,806 A * 11/1968 Bellairs ............... B60G 3/01
280/789
(Continued)

FOREIGN PATENT DOCUMENTS

CN 1204593 1/1999
CN 101218145 7/2008
(Continued)

OTHER PUBLICATIONS

DE29519108U1 machine translation from espacenet.com (Year: 2023).*
(Continued)

*Primary Examiner* — Paul N Dickson
*Assistant Examiner* — Maxwell L Meshaka
(74) *Attorney, Agent, or Firm* — PEARL COHEN ZEDEK LATZER BARATZ LLP

(57) ABSTRACT

Some embodiments may provide a suspension unit that may include a rail having a longitudinal axis, a sliding member slidably connected to the rail, and shock absorption and springing means adapted to damp motions and support forces along the longitudinal axis of the rail, wherein, the rail and the sliding member are shaped to have transverse cross-sectional profiles that prevent a rotational movement of the sliding member with respect to the rail about the longitudinal axis of the rail. In some embodiments, the suspension unit may be part of an in-wheel system further including at least a steering unit.

19 Claims, 24 Drawing Sheets

Related U.S. Application Data

(60) Provisional application No. 62/835,230, filed on Apr. 17, 2019.

(51) Int. Cl.
    *B60G 13/16* (2006.01)
    *B62D 7/14* (2006.01)

(52) U.S. Cl.
    CPC ........ *B62D 5/0463* (2013.01); *B60G 2200/44* (2013.01); *B60G 2204/30* (2013.01); *B60G 2204/4232* (2013.01); *B62D 7/14* (2013.01)

(56) References Cited

U.S. PATENT DOCUMENTS

| | | | |
|---|---|---|---|
| 3,830,517 A * | 8/1974 | McNeill | B62K 25/10 |
| | | | 280/285 |
| 3,927,900 A | 12/1975 | Wischmeier | |
| 4,460,186 A | 7/1984 | Hildebrand | |
| 4,783,095 A | 11/1988 | Rampini et al. | |
| 4,991,698 A * | 2/1991 | Hanson | B60G 3/01 |
| | | | 267/221 |
| 6,113,119 A | 9/2000 | Laurent et al. | |
| 6,257,604 B1 | 7/2001 | Laurent et al. | |
| 6,357,770 B1 | 3/2002 | Carpiaux et al. | |
| 7,347,295 B2 | 3/2008 | Kurata | |
| 7,644,938 B2 | 1/2010 | Yamada | |
| 7,775,529 B2 * | 8/2010 | Kinkaide | B60G 3/00 |
| | | | 280/6.153 |
| 8,037,957 B2 | 10/2011 | Laurent | |
| 8,205,893 B2 | 6/2012 | Peterson | |
| 9,290,074 B2 * | 3/2016 | Slawson | B60G 3/01 |
| 9,604,519 B2 * | 3/2017 | Slawson | B60G 17/005 |
| 10,414,234 B2 * | 9/2019 | McGuire | B60G 13/16 |
| 10,836,230 B2 | 11/2020 | Hintzen et al. | |
| 2008/0093818 A1 * | 4/2008 | Nykanen | F16F 9/46 |
| | | | 280/124.16 |
| 2008/0100021 A1 | 5/2008 | Yamada | |
| 2009/0071743 A1 | 3/2009 | Gashi | |
| 2009/0101425 A1 | 4/2009 | Laurent | |
| 2009/0115154 A1 | 5/2009 | Kinkaide | |
| 2012/0098221 A1 * | 4/2012 | Michel | B62D 7/146 |
| | | | 280/86.758 |
| 2015/0102570 A1 * | 4/2015 | Slawson | B60G 3/01 |
| | | | 280/6.157 |
| 2015/0102572 A1 * | 4/2015 | Slawson | B60G 11/27 |
| | | | 180/417 |
| 2016/0193889 A1 * | 7/2016 | Slawson | B60G 3/01 |
| | | | 280/6.157 |
| 2018/0208009 A1 * | 7/2018 | McGuire | F16F 9/3221 |
| 2022/0228652 A1 * | 7/2022 | Georgiou | H02K 21/00 |

FOREIGN PATENT DOCUMENTS

| | | | |
|---|---|---|---|
| CN | 101287616 | 10/2008 | |
| CN | 102717696 | 10/2012 | |
| CN | 106627746 | 5/2017 | |
| DE | 295 19 108 | 4/1997 | |
| DE | 202 06 959 | 8/2002 | |
| DE | 10 2014 100621 | 3/2016 | |
| DE | 102016007996 A1 * | 1/2018 | ............ B60G 13/00 |
| EP | 0 878 332 | 7/2002 | |
| EP | 2127917 | 12/2009 | |
| FR | 1 067 478 | 6/1954 | |
| FR | 2582997 A1 | 12/1986 | |
| GB | 519063 | 3/1940 | |
| GB | 1 206 695 | 9/1970 | |
| JP | H03197222 | 8/1991 | |
| JP | 10-338009 | 12/1998 | |
| JP | 2007062498 | 3/2007 | |
| JP | 2010018209 | 1/2010 | |
| JP | 2016047690 | 4/2016 | |
| JP | 2016049883 | 4/2016 | |
| NL | 1000836 C2 | 1/1997 | |
| WO | WO2006030532 | 3/2006 | |
| WO | WO 2007/006776 | 1/2007 | |
| WO | WO 2019/060966 | 4/2019 | |

OTHER PUBLICATIONS

DE 102016007996 A1 machine translation from espacenet.com (Year: 2023).*

India Office Action for Appl. No. 202117049255 dated Mar. 15, 2022.

Office Action for Japanese Patent Appl. No. 2021-561809 dated Apr. 25, 2022.

European Search Report for Patent Application No. EP 20 79 1566.1 dated Jan. 30, 2023.

* cited by examiner

SLIDING PILLAR SUSPENSION SYSTEM

CROSS-REFERENCE TO RELATED APPLICATIONS

This application is a continuation of U.S. patent application Ser. No. 16/975,744, filed on Aug. 26, 2020, which is a National Phase Application of PCT International Application No. PCT/IL2020/050446, International Filing Date Apr. 16, 2020, claiming the benefit of U.S. Provisional Patent Application No. 62/835,230, filed Apr. 17, 2019, which are hereby incorporated by reference.

FIELD OF THE INVENTION

The present invention relates to the field of suspension systems, and more particularly, to suspension systems having a sliding member.

BACKGROUND OF THE INVENTION

Early vehicles, for example those from the beginning of the 20$^{th}$ century, incorporated suspension systems of "sliding pillar" or of "sliding axle" type. These suspension systems typically included a damper unit that was adapted to slide on a circular slider and utilized a frictional bushing(s) for enabling the sliding thereof. In these vehicles, a steering axis (e.g., an axis about which the wheel may turn to steer the vehicle) typically was aligned with an axis of the damper unit.

SUMMARY OF THE INVENTION

Some embodiments of the present invention may provide a sliding pillar suspension unit, the suspension unit may include: a rail having a longitudinal axis; a sliding member slidably connected to the rail; and shock absorption and springing means adapted to damp motions and support forces along the longitudinal axis of the rail; wherein, the rail and the sliding member are shaped to have transverse cross-sectional profiles that prevent a rotational movement of the sliding member with respect to the rail about the longitudinal axis of the rail.

In some embodiments, at least a portion of the transverse cross-sectional profiles of the rail and the sliding member is a polygonal.

In some embodiments, at least a portion of the transverse cross-sectional profiles of the rail and the sliding member is asymmetric about longitudinal axes thereof.

In some embodiments, the suspension unit may include roller bearings disposed within cavities on at least some of inner lateral surfaces of the sliding member.

In some embodiments, the suspension unit may include bearing adjusting pins adapted to be screwed into the cavities, wherein a shape and a measure of screwing of the bearing adjusting pins into the cavities dictate at least one of a position and an alignment of the roller bearings within the cavities.

In some embodiments, the shock absorption and springing means may include a spring-loaded shock absorber.

In some embodiments, the spring-loaded shock absorber is disposed within the rail.

In some embodiments, the spring-loaded shock absorber is connected at its first end to the rail and connected at its second to the sliding member using one or more pins adapted to slide within corresponding one or more slots on one or more lateral surfaces of the rail.

In some embodiments, the one or more slots are sealed with one or more flexible sleeves.

In some embodiments, the shock absorption and springing means are due to a magnetic force generatable between the sliding member and the rail.

In some embodiments, the rail is adapted to be connected to a wheel of a vehicle and the sliding member is adapted to connected to a reference frame of a vehicle.

In some embodiments, the rail is adapted to be connected to a reference frame of a vehicle and the sliding member is adapted to be connected to a wheel of a vehicle.

In some embodiments, the longitudinal axis of the rail is curved and the sliding member is adapted to slide on the rail along the curved longitudinal axis.

In some embodiments, at least a portion of at least one of the rail and the sliding member are adapted to be disposed within a rim of a wheel when a wheel is assembled into the suspension unit.

In some embodiments, the rail and the sliding member are adapted to be disposed external to a rim of a wheel and adjacent thereto when a wheel is assembled into the suspension unit.

Some embodiments of the present invention may provide an in-wheel system for a wheel of a vehicle, the system may include: a wheel interface adapted to rotatably support the wheel of the vehicle; a suspension unit that may include: a rail having a longitudinal axis; a sliding member slidably connected to the rail; and shock absorption and springing means adapted to damp motions and support forces along the longitudinal axis of the rail; wherein, the rail and the sliding member are shaped to have transverse cross-sectional profiles that prevent a rotational movement of the sliding member with respect to the rail about the longitudinal axis of the rail; and a steering unit disposed between the suspension unit and the wheel interface and adapted to steer the wheel interface about a steering axis, wherein the steering axis is offset from the longitudinal axis of the rail towards the wheel interface.

In some embodiments, at least a portion of the steering unit is adapted to be disposed within a rim of the wheel when the wheel is assembled into the system.

In some embodiments, the steering unit may include two pivoting members connected to the suspension unit and to the wheel interface, the pivoting members define the steering axis and are adapted to enable rotation of the wheel interface about the steering axis and with respect to the suspension unit.

In some embodiments, the pivoting members are connected to the rail of the suspension unit.

In some embodiments, the pivoting members are connected to the sliding member of the suspension unit.

In some embodiments, the steering unit may include a steering mechanism interface connected to at least one of the pivoting members and adapted to be connected to a steering mechanism, the steering mechanism interface is adapted to turn the pivoting members and the wheel interface connected thereto with respect to the suspension unit and about the steering axis.

In some embodiments, the system may include a steering mechanism, the steering mechanism may include: a steering motor connected to a sprung mass of the suspension unit and adapted to generate rotational motions; a steering rod connected to the steering motor using a first gear assembly, the first gear assembly is configured to transmit rotational motions from the steering motor to the steering rod; and a second gear assembly adapted to transmit the rotational motions from the steering rod to a gear of at least one of the pivoting members to turn the wheel interface connected to the pivoting members about the steering axis with respect to the suspension unit.

In some embodiments, the steering rod and the first gear assembly are adapted to enable sliding of the first gear assembly on the steering rod when the sliding member slides on the rail, while yet transmitting the rotational motions generated by the steering motor to the steering rod.

In some embodiments, the second gear assembly may include a worm gear.

In some embodiments, the steering rod is parallel to the longitudinal axis.

In some embodiments, the steering rod is telescopic.

In some embodiments, the sprung mass of the suspension unit is the rail thereof.

In some embodiments, the sprung mass of the suspension unit is the sliding member thereof.

In some embodiments, the steering unit may include a frameless motor connected to the suspension unit and the wheel interface and adapted to rotate the wheel interface with respect to the suspension unit about the steering axis.

In some embodiments, the frameless motor may include: a stator connected to the suspension unit and the wheel interface; and a rotor adapted to rotate the stator.

In some embodiments, a rotation axis of the rotor coincides with the steering axis.

In some embodiments, the frameless motor is connected to the rail of the suspension unit.

In some embodiments, the frameless motor is connected to the sliding member of the suspension unit.

In some embodiments, the steering unit may include at least one pair of arms, each pair may include a first arm and a second arm pivotally connected at their first ends to the wheel interface and pivotally connected at their second ends to the suspension unit.

In some embodiments, the first arm and the second arm are pivotally connected to the rail of the suspension system.

In some embodiments, the first arm and the second arm are pivotally connected to the sliding member of the suspension system.

In some embodiments, the first arm and the second arm are set across each other and define a dynamic steering axis at a virtual intersection therebetween such that the dynamic steering axis may move with respect to the suspension unit when the wheel interface changes its steering angle relative the suspension unit.

In some embodiments, the system may include a braking unit, the braking unit may include a brake actuator connected to the wheel interface.

In some embodiments, the braking unit may include a brake fluid reservoir in fluid communication with the brake actuator, the brake fluid reservoir is connected to the sliding member of the suspension unit.

In some embodiments, the braking unit is a brake-by-wire unit.

In some embodiments, the braking unit may include a controller configured to control the braking of the wheel interface by the brake actuator.

In some embodiments, the system may include a traction unit, the traction unit may include: a traction motor; and a shaft adapted to transmit rotations from the traction motor to a wheel hub rotatably supported by the wheel interface.

In some embodiments, the traction motor is connected to the suspension unit.

In some embodiments, the traction motor is connected to the wheel interface.

In some embodiments, at least a portion of the transverse cross-sectional profiles of the rail and the sliding member is at least one of: a polygonal and asymmetric about longitudinal axes thereof.

In some embodiments, the suspension unit may include roller bearings disposed within cavities on at least some of inner lateral surfaces of the sliding member; and bearing adjusting pins adapted to be screwed into the cavities, wherein a shape and a measure of screwing of the bearing adjusting pins into the cavities dictate at least one of a position and an alignment of the roller bearings within the cavities.

In some embodiments, the shock absorption and springing means may include a spring-loaded shock absorber disposed within the rail; and the spring-loaded shock absorber is connected at its first end to the rail and connected at its second to the sliding member using one or more pins adapted to slide within corresponding one or more slots on one or more lateral surfaces of the rail.

In some embodiments, the longitudinal axis of the rail is curved and the sliding member is adapted to slide on the rail along the curved longitudinal axis.

In some embodiments, at least a portion of at least one of the rail and the sliding member are adapted to be disposed within a rim of a wheel when a wheel is assembled into the suspension unit.

In some embodiments, the rail and the sliding member are adapted to be disposed external to a rim of a wheel and adjacent thereto when a wheel is assembled into the suspension unit.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
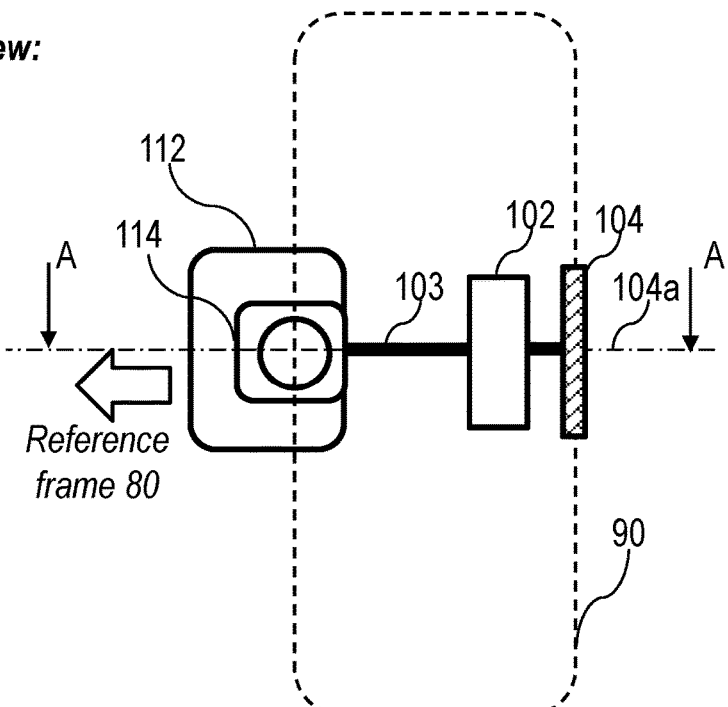
FIGS. 1A, 1B and 1C are schematic illustrations of an embodiment of a suspension unit and of a wheel assembled into the suspension unit, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Some embodiments of the present invention may provide a suspension system for a wheel of a vehicle. The suspension system may include a suspension unit. For example, the suspension unit may be a sliding pillar suspension unit. The suspension unit may include a sliding member slidably coupled to a longitudinal rail. The longitudinal rail and/or the sliding member may be shaped to prevent a rotational movement of the sliding member about a longitudinal axis of the suspension unit.

The suspension unit may be adapted to be connected to a reference frame (e.g., a chassis) of the vehicle and may be adapted to damp and absorb shocks and/or motions resulted from, for example, bumps or potholes in the road, and/or to support a weight of the vehicle along a longitudinal axis (or substantially along the longitudinal axis) of the suspension unit. In some embodiments, at least a portion of the suspension unit may be adapted to be located within a rim of the wheel. In some embodiments, the longitudinal axis of the suspension unit may be curved. This may, for example, allow a curved movement of the wheel.

In some embodiments, the suspension system may include a wheel interface and a wheel hub. The wheel interface may be adapted to rotatably support the wheel hub and may be adapted to be connected to the suspension unit.

Some embodiments of the present invention may provide an in-wheel system. The in-wheel system may include a suspension unit (e.g., sliding pillar suspension unit described herein) and a steering unit. In some embodiments, the steering unit may be coupled to the suspension unit. In some embodiments, the steering unit may be decoupled of the suspension unit. Various embodiments of the steering unit may be used. Some examples of the steering unit are described below.

Figure 1B:
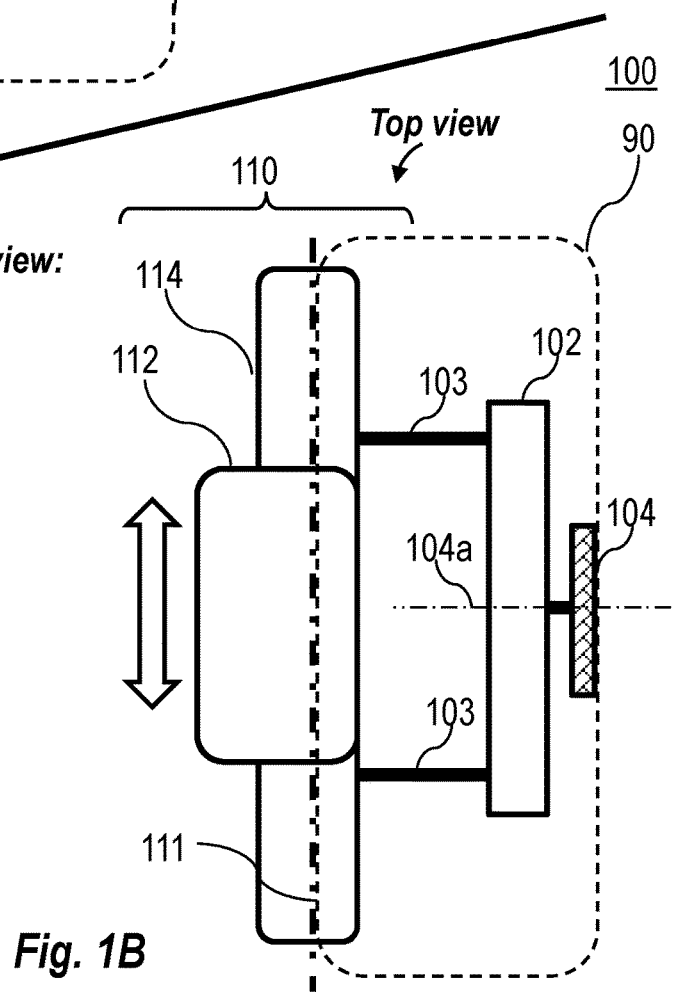
Figure 1C:
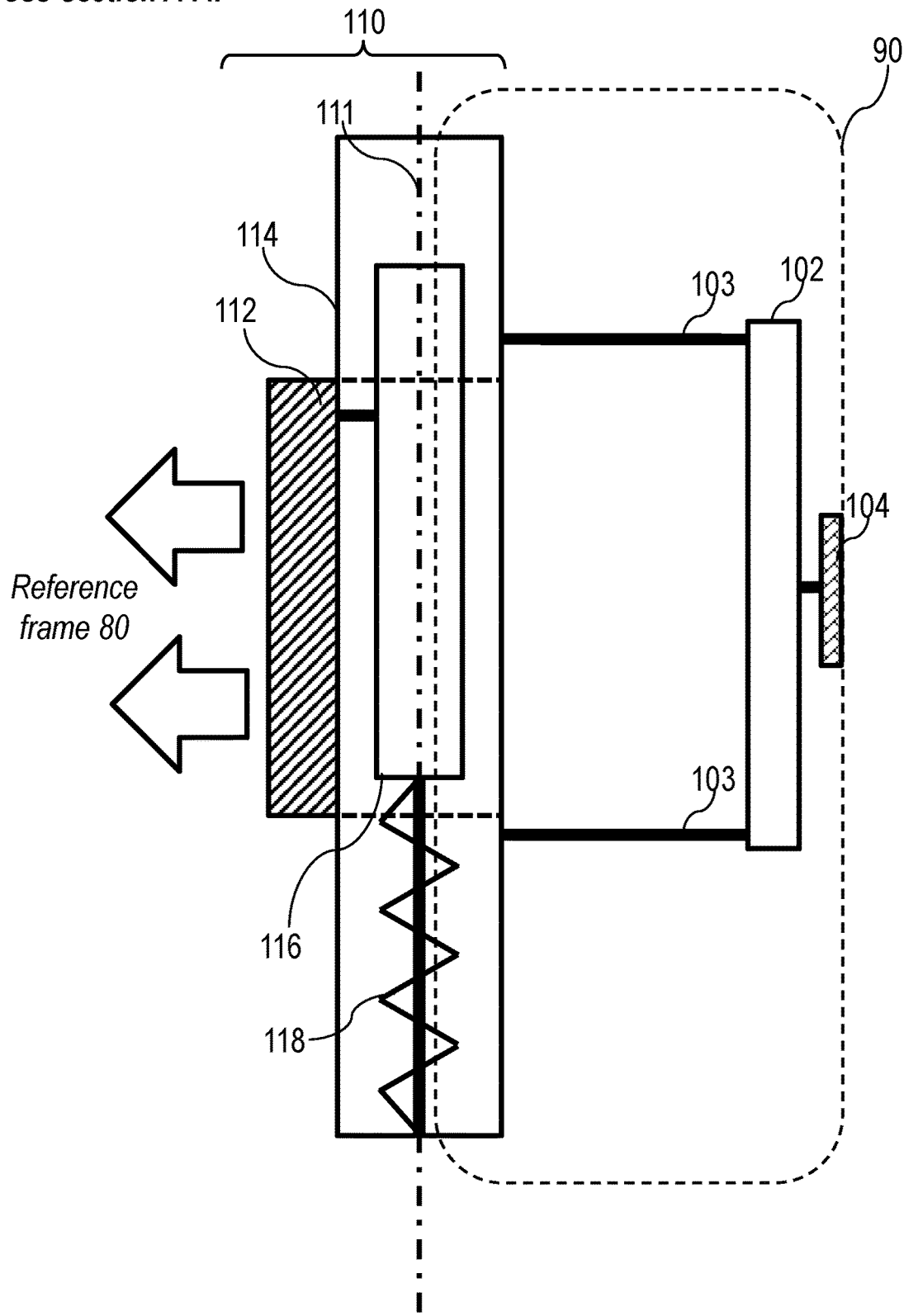

Reference is now made to FIGS. 1A, 1B and 1C, which are schematic illustrations of an embodiment of a suspension system 100 and of a wheel 90 assembled into a suspension system 100, according to some embodiments of the invention.

FIG. 1A shows a schematic top view of suspension system 100. FIG. 1B shows a schematic side view of suspension system 100. FIG. 1C shows a schematic longitudinal cross-sectional view of suspension system 100.

Suspension system 100 may include a suspension unit 110. Suspension unit 110 may be adapted to be connected to a reference frame 80 of a vehicle and to a wheel 90. Reference frame 80 may be, for example, a chassis of the vehicle. Suspension unit 110 may be adapted to damp and absorb shocks and motions resulting from, for example, bumps or potholes in the road. Suspension unit 110 may be further adapted to withstand lateral forces applied thereon (e.g., forces in longitudinal and/or side directions of the vehicle). Suspension unit 110 may be further adapted to support a weight of the vehicle along a longitudinal axis 111 (or substantially along a longitudinal axis 111) thereof (e.g., wherein longitudinal axis 111 is parallel, or substantially parallel to a vertical axis of the vehicle).

In some embodiments, suspension unit 110 may be adapted to be connected to reference frame 80 such that longitudinal axis 111 of suspension unit 110 is perpendicular (or substantially perpendicular) to the ground surface/road on which the wheel may turn (e.g., such that longitudinal axis 111 is parallel or substantially parallel to the vertical axis of the vehicle). In some embodiments, suspension unit 110 may be adapted to be connected to reference frame 80 such that longitudinal axis 111 of suspension unit 110 is perpendicular (or substantially perpendicular) to wheel hub rotation axis 104a about which a wheel hub 104 of suspension system 100 may rotate.

Suspension unit 110 may include a sliding member 112 and a rail 114. A longitudinal axis of rail 114 may coincide with longitudinal axis 111 of suspension unit 110. In some embodiments, sliding member 112 may be adapted to be connected to reference frame 80 of the vehicle and rail 114 may be adapted to be connected to wheel 90. In some embodiments, rail 114 may be adapted to be connected to reference frame 80 of the vehicle and sliding member 112 may be adapted to be connected to wheel 90. Sliding member 112 may be adapted to slide on rail 114.

In some embodiments, suspension system 100 may include a wheel interface 102 and a wheel hub 104. Wheel interface 102 may be adapted to rotatably support wheel hub 104 and to enable rotation of wheel hub 104 about a wheel hub rotation axis 104a. In some embodiments, wheel hub rotation axis 104a may be perpendicular (or substantially perpendicular) to longitudinal axis 111 of suspension unit 110. In various embodiments, rail 114 may be connected to wheel interface 102 (e.g., using one or more connectors 103 as shown in FIGS. 1A, 1B and 1C). In various embodiments, sliding member 112 or rail 114 may be connected to wheel interface 102. Connection of rail 114 to wheel 90 (e.g., which is an un-sprung mass) and of sliding member 112 to reference frame 80 of the vehicle (e.g., which is a sprung mass) may enable to maximize a travel of sliding member 112 along rail 114. For example, in embodiments of FIGS. 1A and 1B, sliding member 112 may potentially slide along an entire length of rail 114. In this manner, suspension unit 110 may, for example, enable to minimize forces transferred to reference frame 80 of the vehicle and to maximize a comfort of the passengers in the vehicle.

Rail 114 and/or sliding member 112 may be shaped to prevent a rotational movement of sliding member 112 about a longitudinal axis 111 of suspension unit 110. For example, transverse cross-sectional profile of rail 114 and sliding 112 may have a general polygonal shape (e.g., square, hexagonal, pentagonal, etc.). The shape of the transverse cross-sectional profile of sliding element 112 and of rail 114 may be selected to, for example, withstand the specified regime of forces expected to be applied onto suspension unit 110.

In some embodiments, transverse cross-sectional profile of at least one of rail 114 and sliding 112 may have a general oblique shape. This may, for example, prevent a rotational movement of sliding member 112 about a longitudinal axis 111 of suspension unit 110.

In various embodiments, one or more protruding surfaces may be shaped, or added, at one or more of outside surface of rail 114 facing sliding member 112 and/or at one or more of inside surfaces of sliding member 112 facing rail 114. This may, for example, prevent a rotational movement of sliding member 112 about a longitudinal axis 111 of suspension unit 110.

Suspension unit 110 may include a shock absorption means 116 and springing means 118 (e.g., as shown in FIG. 1C). Shock absorption means 116 may, for example, include a telescopic shock absorber (e.g., damper). Springing means 118 may, for example, include a spring.

In some embodiments, shock absorption means 116 and springing means 118 may be mounted within rail 114 (e.g., as shown in FIG. 1C). Shock absorption means 116 may be connected to sliding member 112 and to rail 114 while enabling sliding of sliding member 112 on rail 114. Shock absorption means 116 may be adapted to damp and absorb shocks and motions resulting from, for example, bumps or potholes in the road, e.g., by means of converting the relative movement of sliding member 112 with respect to rail 114 into energy that is dampened and/or absorbed/dissipated in the damping means.

Springing means 118 may be adapted to support a weight of the vehicle along longitudinal axis 111 (or substantially along longitudinal axis 111) of suspension unit 110, e.g., by changing a length of springing means 118 and introducing supporting forces (e.g., a preload force) between sliding member 112 and rail 114.

In some embodiments, the shock absorption and springing may be due to a magnetic force generatable between sliding member 112 and rail 114 of suspension unit 110. The magnetic force may be set to define an operational profile of suspension unit 110 (e.g., resistance to linear movements, damping rate, pre-load, etc.). In some embodiments, suspension unit 110 may include an electrical generation circuit. In some embodiments, the electrical generation circuit may generate electrical current by absorbing vibrations induced by interaction between sliding member 112 and rail 114. In some embodiments, the electrical generation circuit may be electrically connected to a battery and is used to charge the battery. In some embodiments, the battery may be integrated in suspension system 110.

In some embodiments, rail 114 may be at least partially curved and may construct a curved longitudinal axis 111. Curved longitudinal axis 111 may, for example, allow dynamic behavior of wheel 90, with an arcuate vertical travel.

In some embodiments, suspension unit 110 may be adapted to be located external to a rim 92 of a wheel 90 of the vehicle and adjacent thereto (e.g., as shown in FIGS. 1A and 1B). In other embodiments, at least a portion suspension unit 110 may be located within rim 92 of wheel 90. In general, a protrusion distance to which suspension unit 110 may protrude from rim 92 of wheel 90 may be dictated by dimensions (e.g., length, diameter) of shock absorption means 116 and springing means 118, which in turn may be dictated by an application of suspension unit 110. In other examples, a protrusion distance to which suspension unit 110 may protrude from rim 92 of wheel 90 may be dictated by the size and location of a steering unit adapted to steer wheel 90 (e.g., as described hereinbelow). For example, the protruding distance may be no more than 25% of a diameter of rim 92.

It is noted that suspension unit 110 may include other elements as well, for example in addition to or instead of the spring-loaded telescopic damper as shown in FIG. 1C. For example, suspension unit 110 may include pneumatic spring, rotary damper and the like.

In some embodiments, a maximal distance between reference frame 80 and wheel hub 104/wheel interface 102 may be smaller than a maximal substantially vertical linear movement of wheel hub 104/wheel interface 102. For example, the distance between reference frame 80 and wheel hub 104/wheel interface 102 may be smaller than 70% (e.g., smaller than 70%, 30%, etc.) of a maximal substantially vertical linear movement of wheel hub 104/wheel interface 102.

In some embodiments, a maximal substantially vertical length of suspension unit 110 may be smaller than a maximal distance between reference frame 80 and wheel hub 104/wheel interface 102. In some embodiments, a maximal substantially vertical length of suspension unit 110 may be smaller than the diameter of the rim of the wheel.

It is to be noted that the dimensions thereof may be larger or smaller and may depend on the dimensions of the rim and/or required range of substantially vertical linear movement of wheel hub 104/wheel interface 102.

Reference is now made to FIGS. 2A, 2B, 2C and 2D, which are schematic illustrations of an embodiment of a suspension unit 210, according to some embodiments of the invention.

Figure 2A:
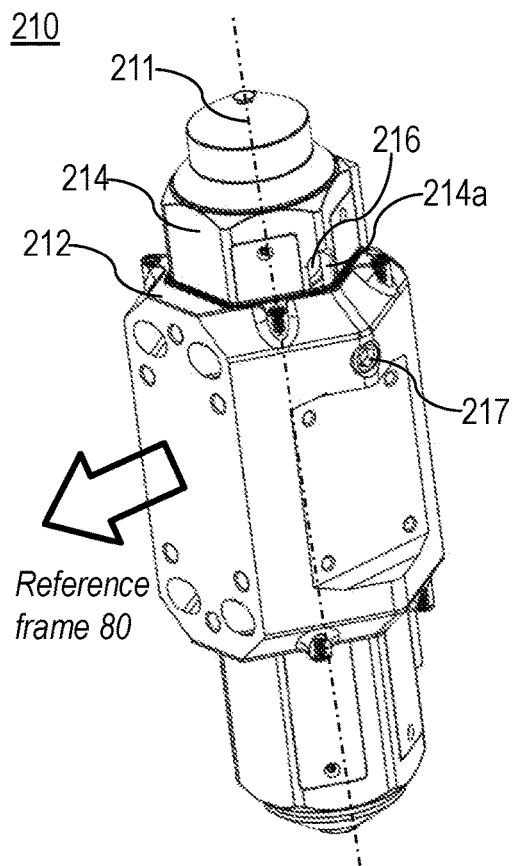
FIGS. 2A, 2B, 2C and 2D are schematic illustrations of an embodiment of a suspension unit, according to some embodiments of the invention.
Figure 2B:
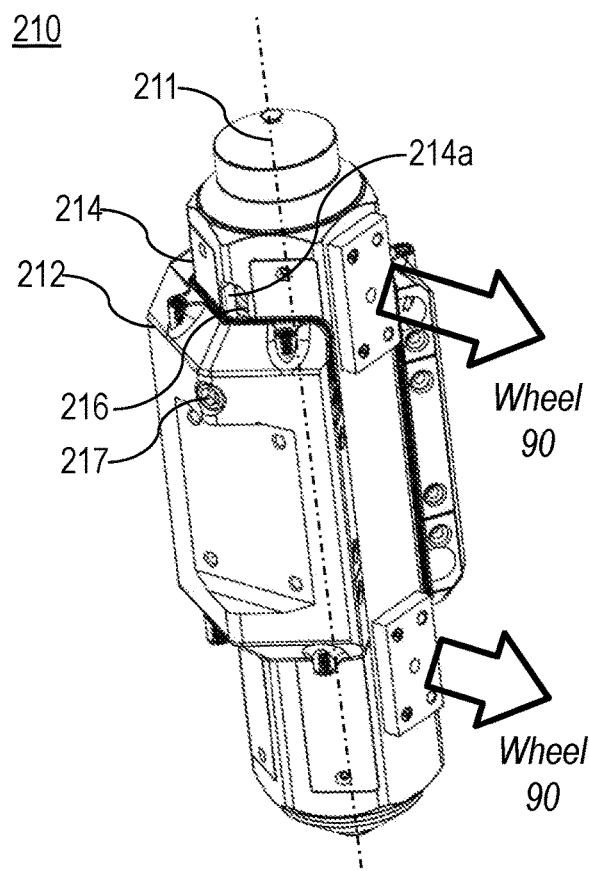
Figure 2C:
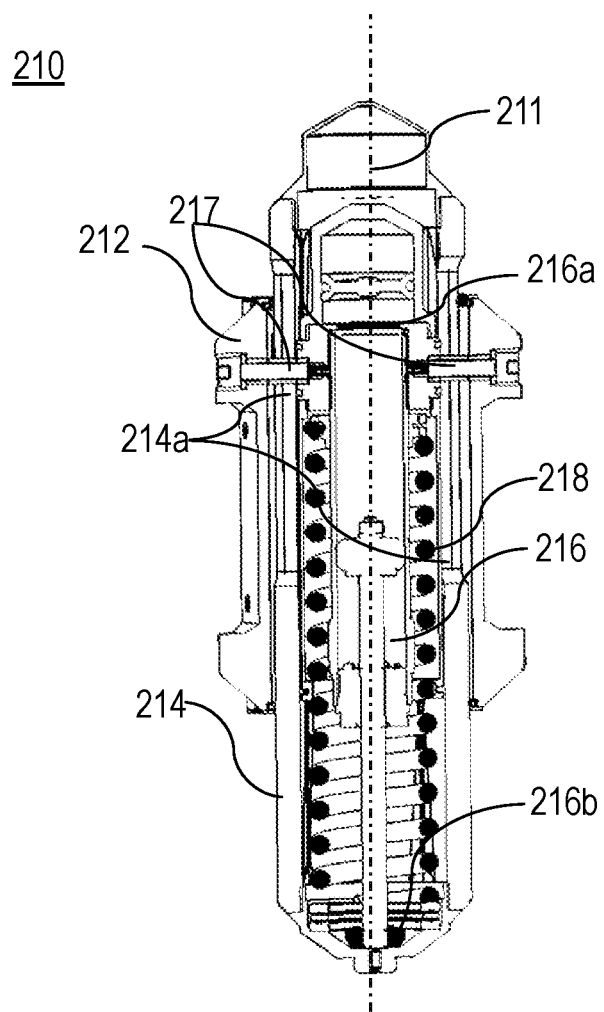
Figure 2D:
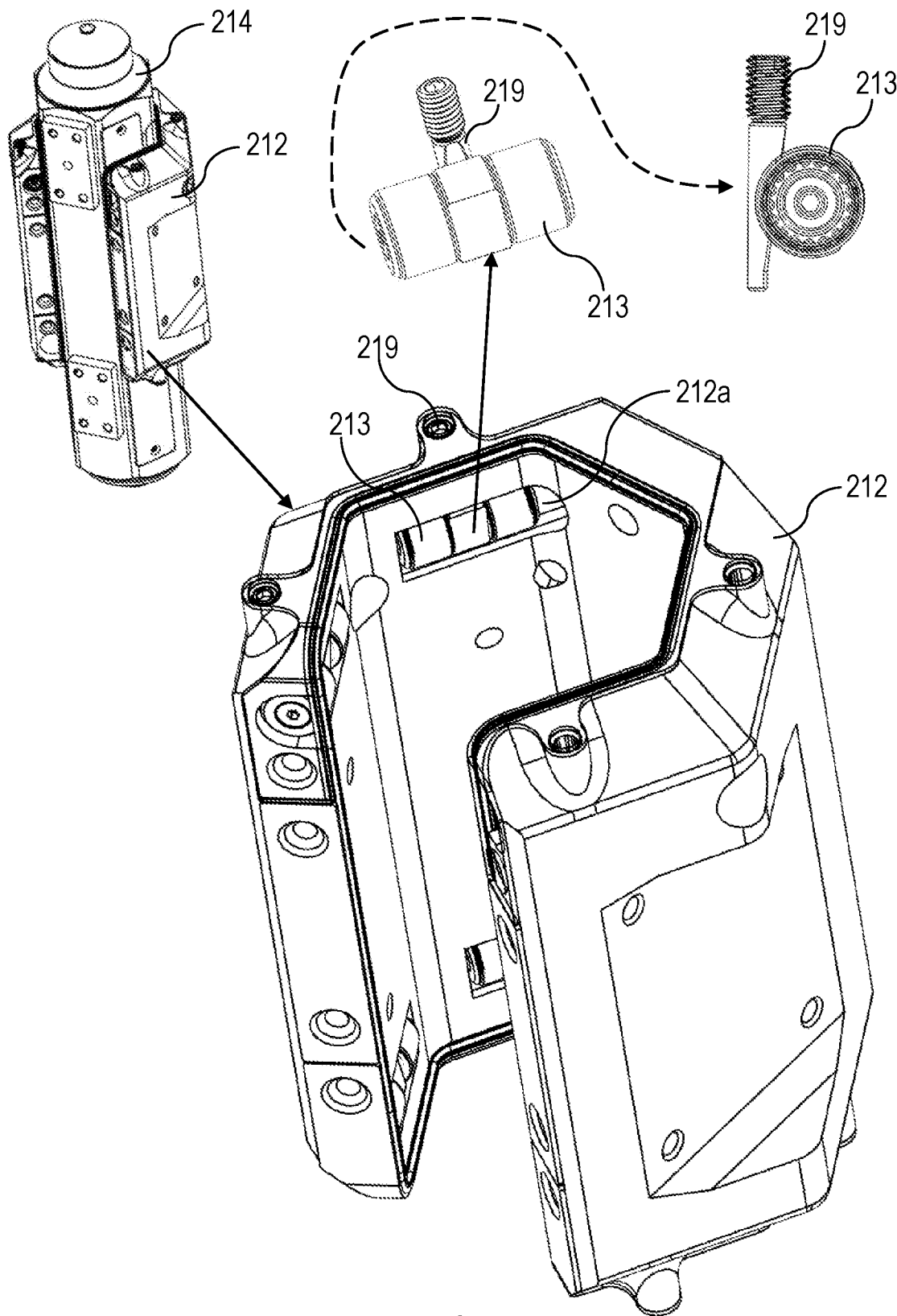

FIGS. 2A, 2B and 2D show different perspective views of suspension unit 210 and FIG. 2C shows a longitudinal cross-sectional view of suspension unit 210. Suspension unit 210 may be similar to suspension unit 110 described above with respect to FIGS. 1A, 1B and 1C.

According to some embodiments, suspension unit 210 may include a sliding member 212 and a rail 214. For example, sliding member 212 and rail 214 may be such as sliding member 112 and rail 114, respectively, as described above with respect to FIGS. 1A and 1B.

In some embodiments, suspension unit 210 may be adapted to be connected to reference frame 80 such that a longitudinal axis 211 of suspension unit 210 is perpendicular (or substantially perpendicular) to the ground surface/the road. A longitudinal axis of rail 214 may coincide with longitudinal axis 211 of suspension unit 210. In some embodiments, suspension unit 210 may be adapted to be connected to reference frame 80 such that longitudinal axis 211 of suspension unit 210 is parallel (or substantially parallel) to a wheel rotation plane in which wheel 90 may rotate when assembled into suspension unit 210. For example, the wheel rotation plane may be defined by a wheel interface of a suspension system.

Suspension unit 210 may be adapted to withstand a specified regime of forces that are expected to be applied onto suspension unit 210. Such forces may, for example, include lateral forces, e.g., forces in directions that are perpendicular to longitudinal axis 211 of suspension unit 210. In some embodiments, a shape of transverse cross-sectional profiles of sliding element 212 and of rail 214 of suspension unit 210 may be selected to withstand the specified regime of forces. In general, the transverse cross-sectional profiles of sliding element 212 and of rail 214 may have any polygonal shape. The shape of the transverse cross-sectional profile of sliding element 212 and of rail 214 may be selected to, for example, withstand the specified regime of forces expected to be applied onto suspension system 200/suspension unit 210.

For example, sliding element 212 and rail 214 may have hexagonal or pentagonal shape of transverse cross-sectional profiles to withstand forces from various directions that are perpendicular to longitudinal axis 211 of suspension unit 210 (e.g., as shown in FIGS. 2A and 2B) or rotational forces acting about longitudinal axis of the suspension unit 210, while enabling free sliding of sliding element 212 along rail 214.

In another example, sliding element 212 and rail 214 may have square shape of transverse cross-sectional profiles to withstand forces from main directions that are perpendicular to longitudinal axis 211 (e.g., applied from a front-rear direction and a side-side direction of the vehicle).

In some embodiments, the shape of transverse cross-sectional profiles of sliding element 212 and rail 214 may be asymmetric about longitudinal axis 211 of suspension unit 210 to withstand forces from various directions that are perpendicular to longitudinal axis 211, according to the predetermined specifications.

In some embodiments, the shape of transverse cross-sectional profiles of sliding element 212 and rail 214 may be selected to prevent a rotation of sliding element 212 and of rail 214 with respect to each other about longitudinal axis 211 of suspension unit 210.

According to some embodiments, suspension unit 210 may include a shock absorption means 216 and a springing means 218. For example, shock absorption means 216 and springing means 218 may be such as shock absorption means 116 and springing means 118, respectively, described above with respect to FIGS. 1A and 1B.

In some embodiments, suspension unit 210 may include a telescopic damper (e.g., shock absorption means 216) loaded with a spring (e.g., springing means 218)—e.g. as shown in FIG. 2C. Shock absorption means 216 may be connected at its first end 216a to sliding member 212 and at its second end 216b to rail 214. In some embodiments, shock absorption means 216 may be connected to sliding member 212 by one or more pins 217 that may be adapted to slide within corresponding one or more slots 214a in corresponding one or more lateral surfaces of rail 214 (e.g., as shown in FIG. 2C).

In some embodiments, slot(s) 214a and pin(s) 217 may be sealed by, for example, flexible sleeve. The sealing thereof may, for example, prevent an ingress of dust and/or other contaminants into rail 214.

In some embodiments, suspension unit 210 may include roller bearings 213 (e.g., as shown in FIG. 2D). Roller bearings 213 may be located between sliding member 212 and rail 214 of suspension unit 210. Roller bearings 213 may enable rolling/relative linear motion of sliding member 212 on rail 214.

In some embodiments, sliding member 212 may include one or more cavities 212a on at least some of inner lateral surfaces thereof (e.g., as shown in FIG. 2D). Each of cavity(s) 212a may be adapted to accommodate one of roller bearings 213.

In some embodiments, suspension unit 210 may include bearing adjusting pins 219. Bearing adjusting pins 219 may be adapted to be screwed into cavities 212a that may accommodate roller bearings 213. The shape of bearing adjusting pins 219 and/or the measure of screwing of bearing adjusting pins 219 into cavities 212a may be adapted to dictate the position/alignment of roller bearings 213 within cavities 212a of sliding member 212 with respect to the rail. In this manner, the preload of each of roller bearings 213 may be adjusted during the installation of suspension unit 210 and/or fabrication misalignments of suspension unit 210 may be compensated.

In various embodiments, at least one of: the shape of the transverse cross-sectional profile of suspension unit 210, the material of suspension unit 210, type and/or number and/or location of bearings 213 within suspension unit 210 may be selected to withstand the specified regime of forces expected to be applied onto suspension unit 210.

In various embodiments, suspension unit 210 may be installed with a zero-camber angle or with a predetermined camber angle that is not zero. In some embodiments, suspension unit 210 may be installed with a dynamic camber angle capability.

In some embodiments, sliding member 212 may act as a sub-frame for connecting suspension unit 210 to reference frame 80. In some embodiments, coupling of the sub-frame (e.g., sliding member 212) to reference frame 80 may be by 4 or less fasteners (e.g., bolts, pins, latches, etc.).

In some embodiments, a steering axis of a wheel may be defined away of longitudinal axis 211 of suspension unit (e.g., being an axis of movement of sliding element 212 with respect to rail 214). For example, a steering axis that is away of longitudinal axis 211 may require a steering unit, e.g., other than suspension unit 210. In some embodiments, a wheel assembled into suspension unit 210 may be not steerable (e.g., without a need in a steering unit).

The following illustrations and description depict examples for an in-wheel system that implements a sliding pillar suspension unit (e.g., such as suspension units 110, 210 described hereinabove) and at least one of steering unit and a traction unit. Each of the in-wheel systems may be implemented using any embodiment of the sliding pillar suspension unit, any embodiment of the steering unit and any embodiment of the traction unit (and/or any combination thereof) described above and/or below according to the in-wheel system's specifications, under constraints resulting from manufacturing issues but not from conceptual issues.

Figure 3A:
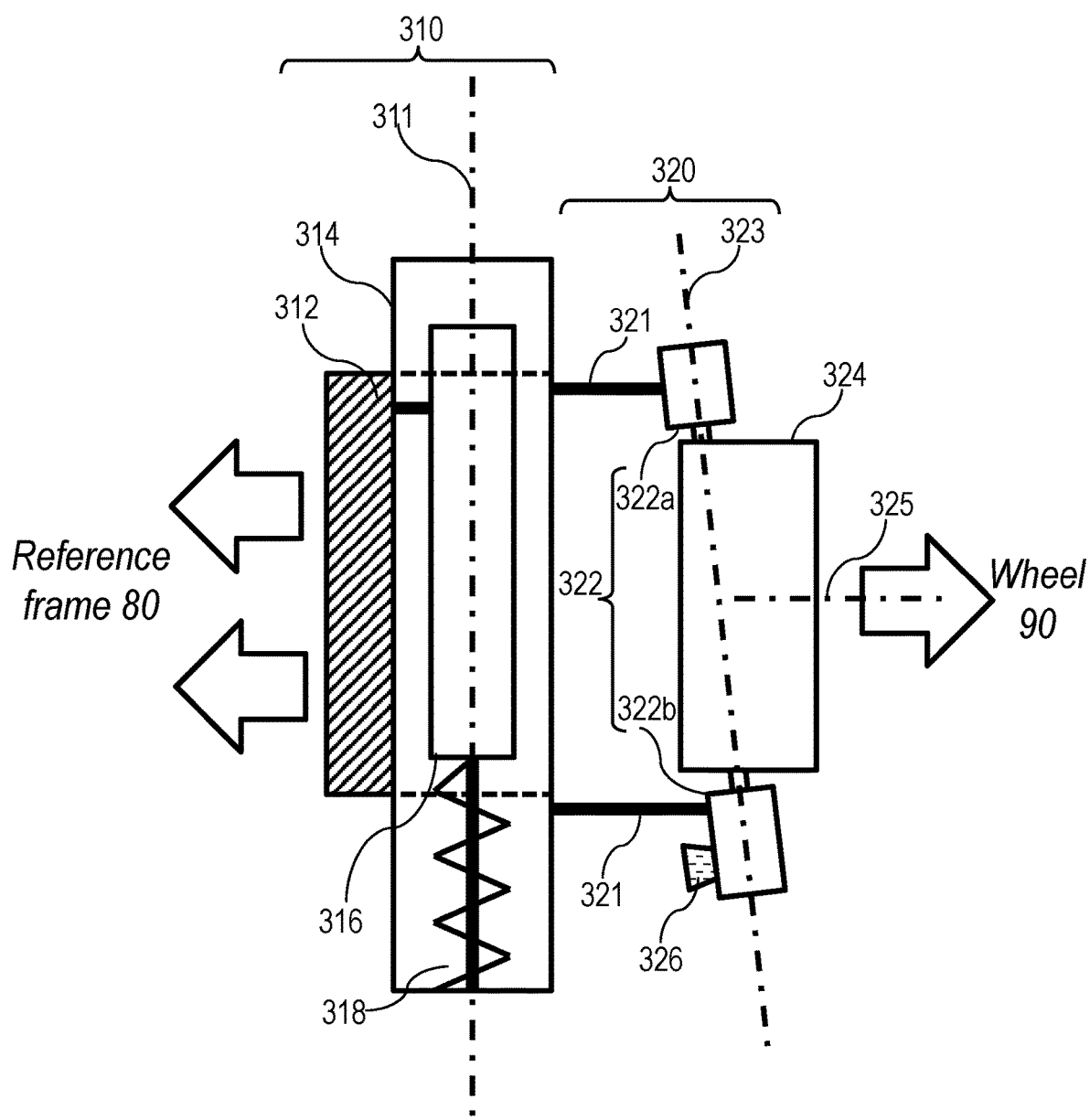
FIG. 3A is a schematic illustration of an embodiment of an in-wheel system with suspension and steering capabilities, according to some embodiments of the invention.

Reference is now made to FIG. 3A, which is a schematic illustration of an in-wheel system 300 with suspension and steering capabilities, according to some embodiments of the invention.

Figure 3B:
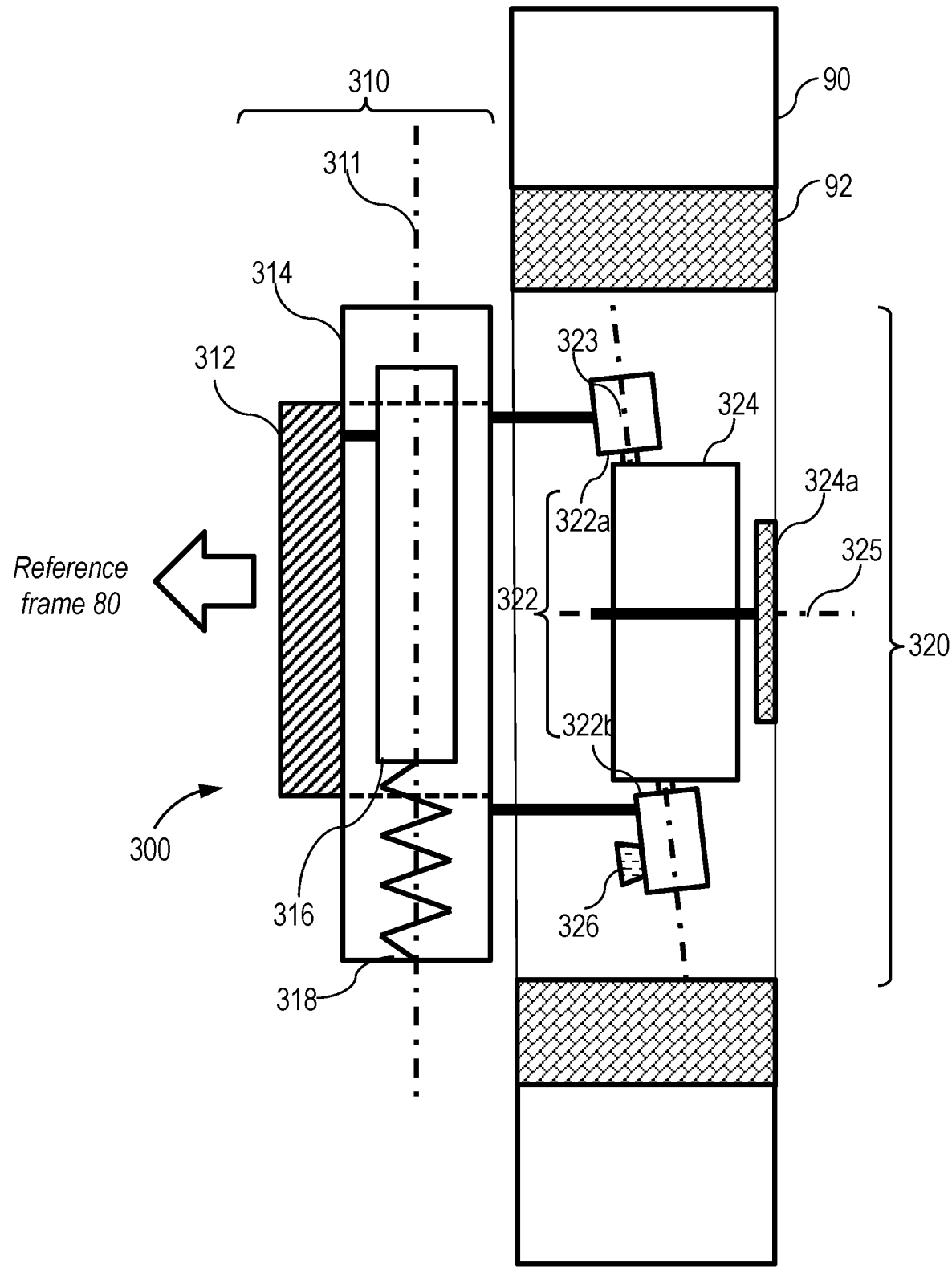
FIGS. 3B and 3C are schematic illustrations of an embodiment of an in-wheel system with suspension and steering capabilities and of a wheel assembled into in-wheel system, according to some embodiments of the invention.
Figure 3C:
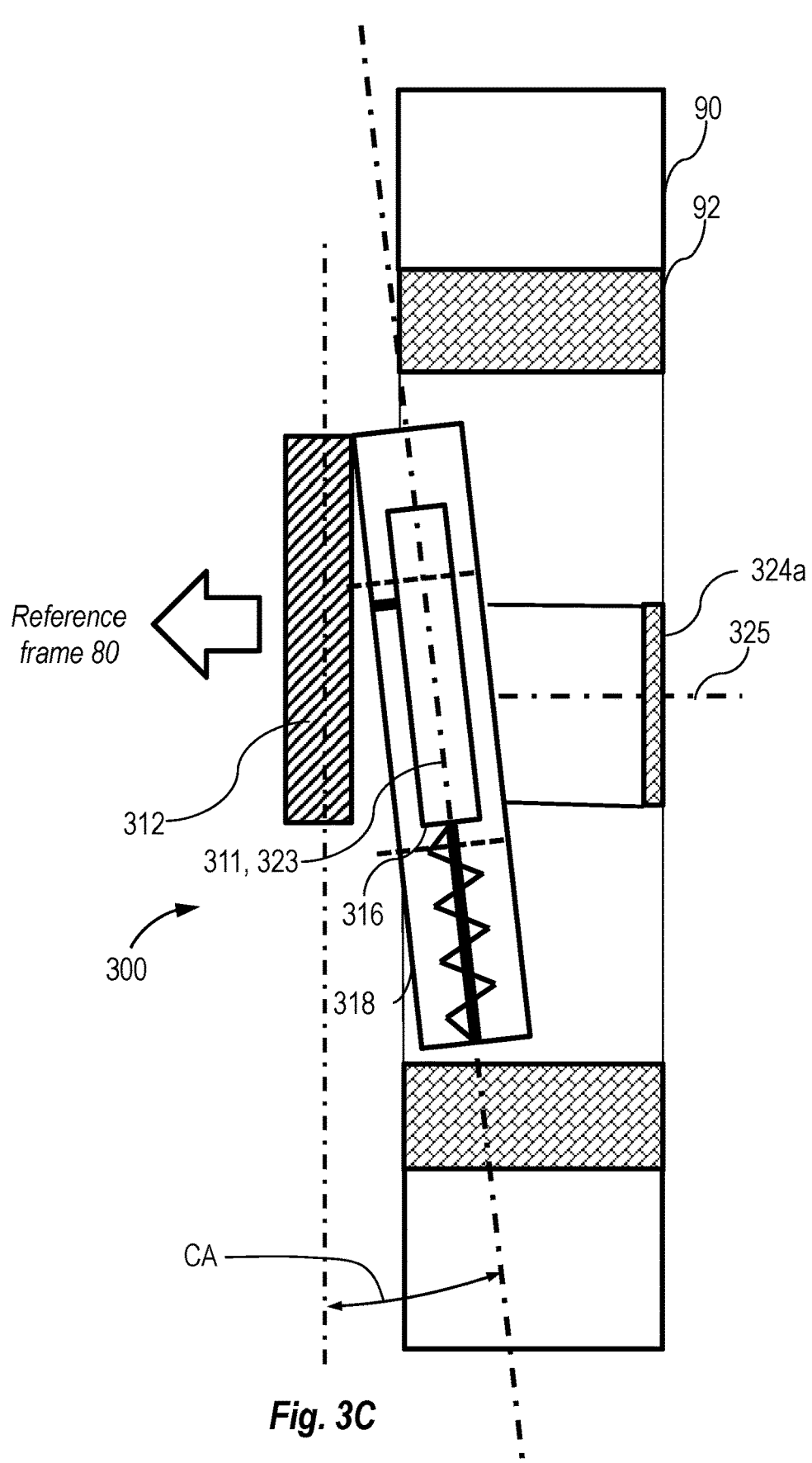

Reference is also made to FIGS. 3B and 3C, which are schematic illustrations of an in-wheel system 300 with suspension and steering capabilities and of a wheel 90 assembled into in-wheel system 300, according to some embodiments of the invention.

In some embodiments, in-wheel system 300 may include a suspension unit 310 and a steering unit 320.

In some embodiments, suspension unit 310 may be adapted to be connected to a reference frame 80 of a vehicle. Reference frame 80 may be, for example, a chassis of the vehicle. Suspension unit 310 may be similar to, for example, suspension unit 110 and/or suspension unit 210 described hereinabove.

Suspension unit 310 may be adapted to damp and absorb shocks and motions resulting from, for example, bumps or potholes in the road. Suspension unit 310 may be further adapted to withstand lateral forces applied thereon (e.g., forces in longitudinal and/or side directions of the vehicle). Suspension unit 310 may be further adapted to support a weight of the vehicle along a longitudinal axis 311 (or substantially along a longitudinal axis 311) thereof (e.g., wherein longitudinal axis 311 is parallel, or substantially parallel to a vertical axis of the vehicle).

In some embodiments, suspension unit 310 may be adapted to be connected to reference frame 80 such that longitudinal axis 311 of suspension unit 310 is perpendicular (or substantially perpendicular) to the ground surface/road on which the wheel may turn (e.g., such that longitudinal axis 311 is parallel or substantially parallel to the vertical axis of the vehicle). In some embodiments, suspension unit 310 may be adapted to be connected to reference frame 80 such that longitudinal axis 311 of suspension unit 310 is perpendicular (or substantially perpendicular) to a wheel rotation axis (e.g., axis 325 described hereinbelow) about which wheel 90 may rotate when wheel 90 is assembled into in-wheel system 300.

Suspension unit 310 may include a sliding member 312 and a rail 314. In some embodiments, sliding member 312 may be adapted to be connected to reference frame 80 of the vehicle and rail 314 may be adapted to be connected to wheel 90. In some embodiments, rail 314 may be adapted to be connected to reference frame 80 of the vehicle and sliding member 312 may be adapted to be connected to wheel 90. Sliding member 312 may be adapted to linearly slide on rail 314. A longitudinal axis of rail 314 may coincide with longitudinal axis 311 of suspension unit 310.

Connection of rail 314 to wheel 90 (e.g., which is an un-sprung mass) and of sliding member 312 to reference frame 80 of the vehicle (e.g., which is a sprung mass) may enable to maximize a travel of sliding member 312 along rail 314. For example, in embodiments of FIGS. 3A and 3B, sliding member 312 may potentially slide along an entire length of rail 314. In this manner, suspension unit 310 may, for example, enable to minimize forces transferred to reference frame 80 of the vehicle and to maximize a comfort of the passengers in the vehicle.

Suspension unit 310 may include a shock absorption means 316 and springing means 318. Shock absorption means 316 may, for example, include a telescopic shock absorber (e.g., damper). Springing means 318 may, for example, include a spring.

In some embodiments, shock absorption means 316 and springing means 318 may be mounted within rail 314. Shock absorption means 316 may be connected to sliding member 312 and to rail 314 while enabling sliding of sliding member 312 on rail 314. Shock absorption means 316 may be adapted to damp and absorb shocks and motions resulting from, for example, bumps or potholes in the road, e.g., by means of converting the relative movement of sliding member 312 with respect to rail 314 into energy that is dampened and/or absorbed/dissipated in the damping means.

Springing means 318 may be adapted to support a weight of the vehicle along longitudinal axis 311 (or substantially along longitudinal axis 311) of suspension unit 310, e.g. by changing a length of springing means 318 and introducing supporting forces (e.g., a preload force) between sliding member 312 and rail 314.

In some embodiments, rail 314 may be at least partially curved and may construct a curved longitudinal axis 311. Curved longitudinal axis 311 may, for example, allow dynamic behavior of wheel 90, with an arcuate vertical travel.

In some embodiments, suspension unit 310 may be adapted to be located external to a rim 92 of a wheel 90 of the vehicle and adjacent thereto (e.g., as shown in FIG. 3B). In other embodiments, at least a portion suspension unit 310 may be located within rim 92 of wheel 90. In general, a protrusion distance to which suspension unit 310 may protrude from rim 92 of wheel 90 may be dictated by size and location of steering unit 320 and/or by dimensions (e.g., length, diameter) of shock absorption means 316 and springing means 318, which in turn may be dictated by an application of suspension system 300. For example, the protruding distance may be no more than 25% of a diameter of rim 92.

It is noted that suspension unit 310 may include other elements as well, for example in addition to or instead of the spring-loaded telescopic damper as shown in FIGS. 3A, 3B and 3C. For example, suspension unit 310 may include pneumatic spring, rotary damper and the like.

In various embodiments, a length of suspension unit 310 (e.g., along longitudinal axis 311 thereof) may be smaller than a diameter of wheel 90 or rim 92 thereof. In some embodiments, the length of suspension unit 310 may be set to fit within a variety of rim diameters.

In some embodiments, steering unit 320 may include two pivoting members 322 (e.g., a first pivoting member 322a and a second pivoting member 322b) and a steering mechanism interface 326.

In some embodiments, in-wheel system 300 may include a wheel interface 324. Wheel interface 324 may be adapted to rotatably support wheel 90 of the vehicle. For example, in-wheel system 300 may include a wheel hub 324a rotatably supported by wheel interface 324, wherein wheel hub 324a may be adapted to be connect to wheel 90 when wheel 90 is assembled into in-wheel system 300.

Pivoting members 322 may be connected to suspension unit 310 (e.g., using one or more connectors 321). For example, pivoting members 322 may be connected to rail 314 of linear shock absorbing mechanism 310. Pivoting members 322 may define a steering axis 323 about which wheel interface 324 may turn.

Wheel interface 324 may be rotatably connected to pivoting members 322 and adapted to be connected to wheel 90 of the vehicle. For example, wheel interface 324 may include a wheel hub 324a adapted to be connected to wheel 90 (e.g., as shown in FIG. 3B). Wheel interface 324 may be adapted to be turned about steering axis 323 by pivoting members 322. In some embodiments, wheel interface 324 may be adapted to enable rotation of wheel hub 324 about an axis 325 that is perpendicular or substantially to longitudinal axis 311 of suspension unit 310.

Steering mechanism interface 326 may be connected to at least one of pivoting members 322. For example, steering mechanism interface 326 may be connected to second pivoting member 322b (e.g., as shown in FIGS. 3A and 3B). Steering mechanism interface 326 may be adapted to be connected to a steering mechanism. Steering mechanism interface 326 may be adapted to pivot pivoting members 322 connected thereto and thereby to turn wheel interface 324 (by means of pivoting members 312) with respect to suspension unit 310 (e.g., with respect to rail 314) and about steering axis 323.

In various embodiments, the steering mechanism may be any of conventional steering linkage mechanisms (such as rack and pinion, pitman arm, etc.) or any of mechanoelectrical steering mechanisms. The entire steering mechanism is not shown in FIGS. 3A and 3B. However, some embodiments of the steering mechanism are described below with respect to FIGS. 4I, 4J, 4K, 4L and 4M.

In some embodiments, as shown in example in FIG. 3C, longitudinal axis 311 of suspension unit 310 may coincide (or substantially coincide) with a steering axis 323 defined by a steering unit. In some embodiments, entire (or substantially entire, or a major part of) suspension unit 310 may be shaped to be located within rim 92 of wheel 90, wherein longitudinal axis 311 of suspension unit 310 coincides with steering axis 323.

In some embodiments, longitudinal axis 311 of suspension unit 310 and steering axis 323 are both inclined with respect a vertical dimension of the reference frame. In some embodiments, longitudinal axis 311 of suspension unit 310 and of steering axis 323 are parallel to each other and are both inclined with respect a vertical dimension of the reference frame. In the embodiment depicted in FIG. 3C the longitudinal axis 311 of suspension unit 310 and steering axis 323 are inclined at the same angle with respect a vertical dimension of the reference frame by a camber angle CA. In some embodiments, suspension unit 310 may be adapted to have longitudinal axis 311 that coincides with steering King-Pin (KPI). In some embodiments, the KPI may be dynamic and suspension unit 310 may be adapted to have longitudinal axis 311 tracking the KPI.

Figure 3D:
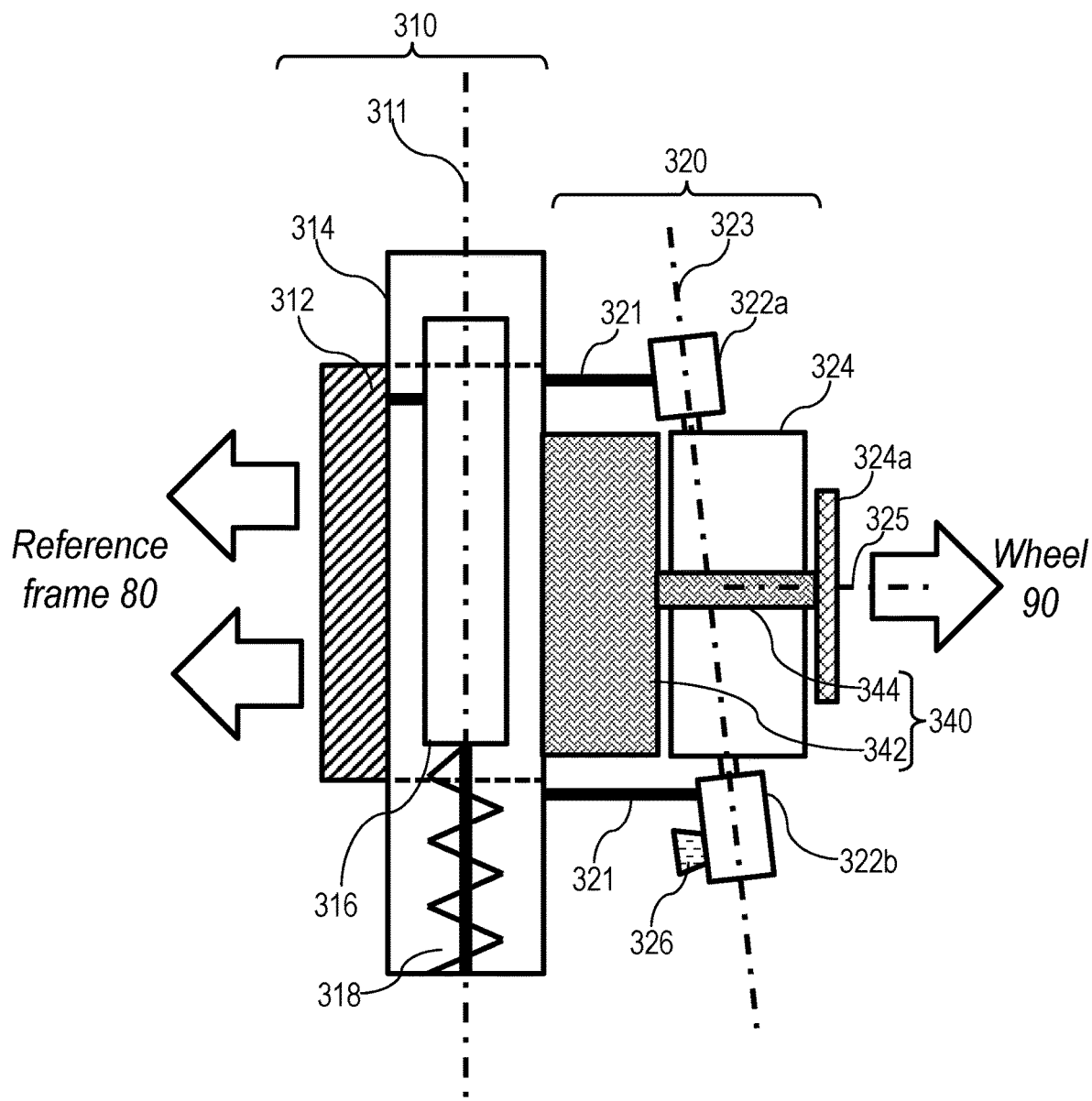
FIG. 3D is a schematic illustration of an embodiment of an in-wheel system with traction capabilities, according to some embodiments of the invention.

Reference is now made to FIG. 3D, which is a schematic illustration of a first embodiment of an in-wheel system 300 with traction capabilities, according to some embodiments of the invention.

In some embodiments, in-wheel system 300 may include a traction unit 340. Traction unit 340 may include a traction motor 342. Traction motor 342 may be disposed between, for example, suspension unit 310 and wheel interface 324. In some embodiments, traction motor 342 is connected to suspension unit 310. For example, traction motor 342 may be connected to sliding member 312. In some embodiments, traction motor 342 is connected to wheel interface 324. Traction unit 340 may include a shaft 344. Shaft 344 may extend between traction motor 342 and wheel hub 324a and configured to rotate wheel hub 324 in response to rotations of traction motor 342.

Figure 4A:
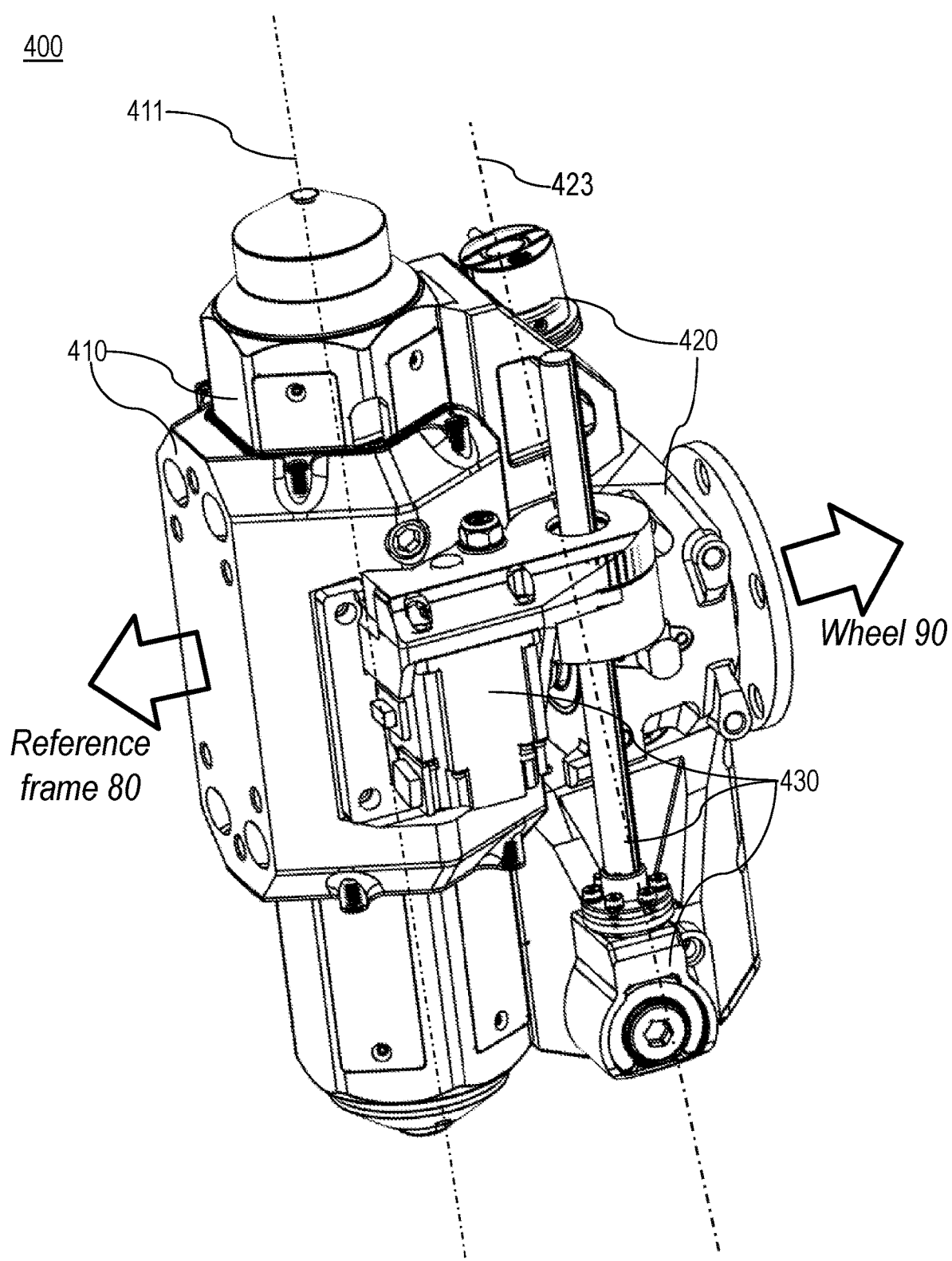
FIG. 4A is a schematic illustration of an embodiment of an in-wheel system with suspension and steering capabilities, according to some embodiments of the invention.

Reference is now made to FIG. 4A, which is a schematic illustration of an embodiment of an in-wheel system 400 with suspension and steering capabilities, according to some embodiments of the invention.

In some embodiments, suspension system 400 may include a suspension unit 410 and a steering unit 420. For example, suspension system 400, suspension unit 410 and steering unit 420 may be such as suspension system 300, suspension unit 310 and steering unit 320, respectively, as described above with respect to FIGS. 3A, 3B and 3C.

In some embodiments, suspension system 400 may include a steering mechanism 430. Steering mechanism 430 may be interfaceable with steering unit 420 and may be adapted to operate steering unit 420. Some embodiments of steering mechanism 430 are described below with respect to FIGS. 4I, 4J, 4K, 4L and 4M. In some other embodiments, steering unit 420 may include a steering linkage coupled to steering mechanism 430. In some embodiments, the steering linkage may include a steering rod (e.g., tie rod) coupled to steering mechanism 430.

Reference is now made to FIGS. 4B, 4C, 4D and 4E, which are schematic illustrations of a suspension unit 410 for a second embodiment of an in-wheel system 400 with suspension and steering capabilities, according to some embodiments of the invention.

Figure 4B:
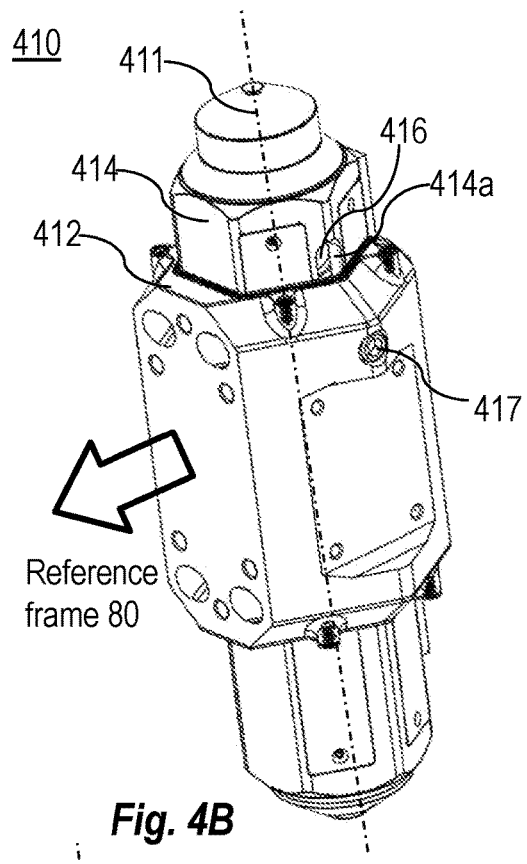
FIGS. 4B, 4C, 4D and 4E are schematic illustrations of a suspension unit for an in-wheel system with suspension and steering capabilities, according to some embodiments of the invention.
Figure 4C:
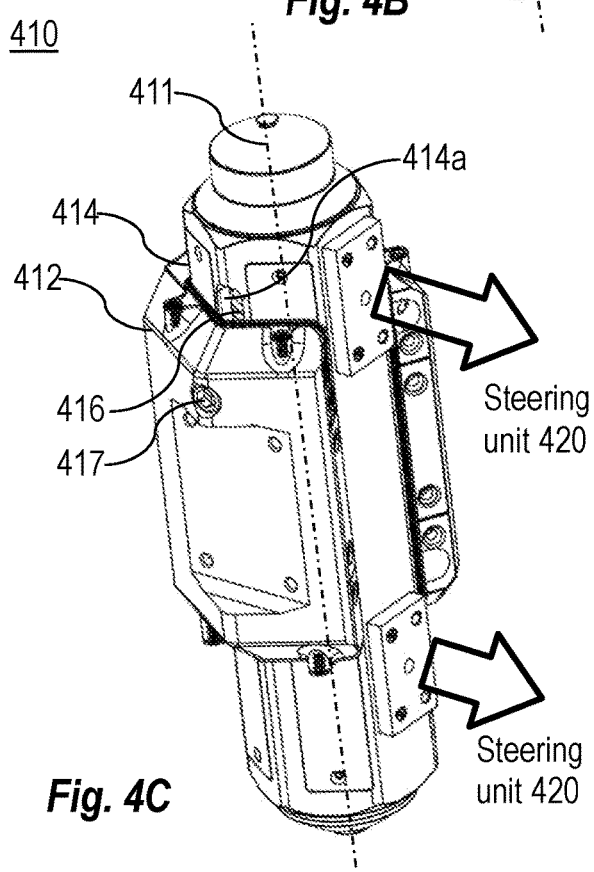
Figure 4D:
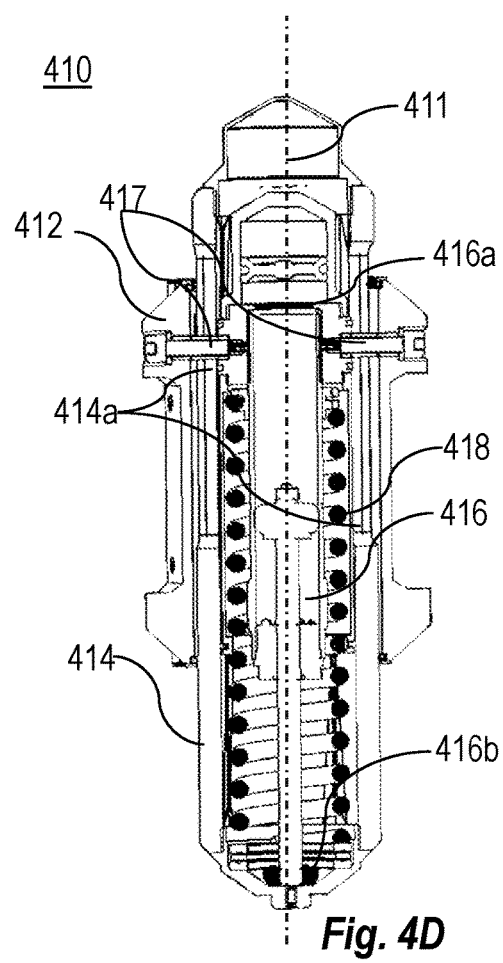
Figure 4E:
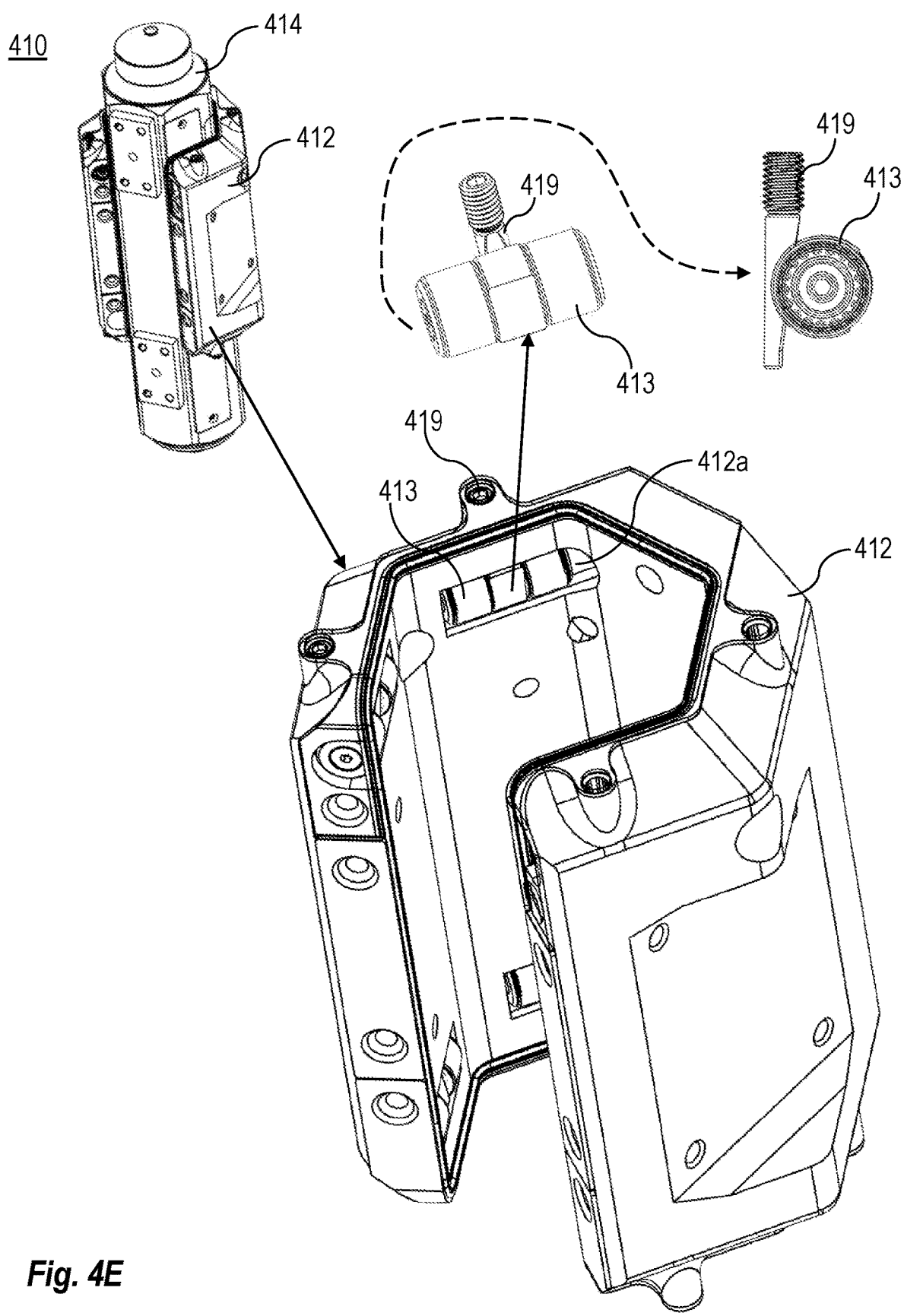

FIGS. 4B, 4C and 4E show different perspective views of suspension unit 410 and FIG. 4D shows a longitudinal cross-sectional view of suspension unit 410.

In some embodiments, suspension unit 410 may include a sliding member 412 and a rail 414. For example, sliding member 412 and rail 414 may be such as sliding member 312 and rail 314, respectively, as described above with respect to FIGS. 3A, 3B and 3C.

In some embodiments, suspension unit 410 may be adapted to be connected to reference frame 80 such that a longitudinal axis 411 of suspension unit 410 is perpendicular (or substantially perpendicular) to the ground surface/the road. A longitudinal axis of rail 414 may coincide with longitudinal axis 411 of suspension unit 410. In some embodiments, suspension unit 410 may be adapted to be connected to reference frame 80 such that longitudinal axis 411 of suspension unit 410 is perpendicular (or substantially perpendicular) to a wheel/wheel hub rotation axis (e.g., axis 425 described hereinbelow) about which wheel 90 may rotate when wheel 90 is assembled into in-wheel system 400.

In some embodiments, suspension unit 410 may be adapted to withstand a specified regime of forces that are expected to be applied onto suspension system 400/suspension unit 410. Such forces may, for example, include lateral forces, e.g. forces in directions that are perpendicular to longitudinal axis 411 of suspension unit 410.

In some embodiments, a shape of transverse cross-sectional profiles of sliding element 412 and of rail 414 of suspension unit 410 may be selected to withstand the specified regime of forces. In general, the transverse cross-sectional profiles of sliding element 412 and of rail 414 may have any polygonal shape. The shape of the transverse cross-sectional profile of sliding element 412 and of rail 414 may be selected to, for example, withstand the specified regime of forces expected to be applied onto suspension system 400/suspension unit 410.

For example, sliding element 412 and rail 414 may have hexagonal or pentagonal shape of transverse cross-sectional profiles to withstand forces from various directions that are perpendicular to longitudinal axis 411 of suspension unit 410 (e.g., as shown in FIGS. 4B and 4C) or rotational forces acting about longitudinal axis of the suspension unit 410, while enabling free sliding of sliding element 412 along rail 414.

In another example, sliding element 412 and rail 414 may have square shape of transverse cross-sectional profiles to withstand forces from main directions that are perpendicular to longitudinal axis 411 (e.g., applied from a front-rear direction and a side-side direction of the vehicle).

In some embodiments, the shape of transverse cross-sectional profiles of sliding element 412 and rail 414 may be asymmetric about longitudinal axis 411 of suspension unit 410 to withstand forces from various directions that are perpendicular to longitudinal axis 411, according to the predetermined specifications.

In some embodiments, the shape of transverse cross-sectional profiles of sliding element 412 and rail 414 may be selected to prevent a rotation of sliding element 412 and of rail 414 with respect to each other about longitudinal axis 411 of suspension unit 410.

In some embodiments, suspension unit 410 may include a shock absorption means 416 and a springing means 418. For example, shock absorption means 416 and springing means 418 may be such as shock absorption means 316 and springing means 318, respectively, described above with respect to FIGS. 3A, 3B and 3C.

In some embodiments, suspension unit 410 may include a telescopic damper (e.g., shock absorption means 416) loaded with a spring (e.g., springing means 418)—e.g., as shown in FIG. 4D. Shock absorption means 416 may be connected at its first end 416a to sliding member 412 and at its second end 416b to rail 414. In some embodiments, shock absorption means 416 may be connected to sliding member 412 by one or more pins 417 that may be adapted to slide within corresponding one or more slots 414a in corresponding one or more lateral surfaces of rail 414 (e.g., as shown in FIG. 4D).

In some embodiments, slot(s) 414a and pin(s) 417 may be sealed by, for example, flexible sleeve. The sealing thereof may, for example, prevent an ingress of dust and/or other contaminants into rail 414.

In some embodiments, suspension unit 410 may include roller bearings 413 (e.g., as shown in FIG. 4E). Roller bearings 413 may be located between sliding member 413 and rail 414 of suspension unit 410. Roller bearings 413 may enable rolling/relative linear motion of sliding member 412 on rail 414.

In some embodiments, sliding member 412 may include one or more cavities 414a on at least some of inner lateral surfaces thereof (e.g., as shown in FIG. 4E). Each of cavity(s) 414a may be adapted to accommodate one of roller bearings 413.

In some embodiments, suspension unit 410 may include bearing adjusting pins 419. Bearing adjusting pins 419 may be adapted to be screwed into cavities 414a that may accommodate roller bearings 413. The shape of bearing adjusting pins 419 and/or the measure of screwing of bearing adjusting pins 419 into cavities 414a may be adapted to dictate the position/alignment of roller bearings 413 within cavities 414a of sliding member 412 with respect to the rail. In this manner, the preload of each of roller bearings 413 may be adjusted during the installation of suspension unit 410 and/or fabrication misalignments of suspension unit 410 may be compensated.

In various embodiments, at least one of: the shape of the transverse cross-sectional profile of suspension unit 410, the material of suspension unit 410, type and/or number and/or location of bearings 413 within suspension unit 410 may be selected to withstand the specified regime of forces expected to be applied onto suspension system 400/suspension unit 410.

In various embodiments, suspension unit 410 may be installed with a zero-camber angle or with a predetermined camber angle that is not zero. In some embodiments, suspension unit 410 may be installed with a dynamic camber angle capability.

In some embodiments, sliding member 412 may act as a sub-frame for connecting suspension system 400 to reference frame 80. In some embodiments, the sub-frame (e.g., sliding member 412) may be coupled to reference frame 80 by four (4) or less fasteners (e.g., bolts, pins, latches).

In some embodiments, a steering axis (e.g., steering axis 423 described below) of a wheel may be defined away of longitudinal axis 411 of suspension unit (e.g., being an axis of movement of sliding element 412 with respect to rail 414). For example, a steering axis that is away of longitudinal axis 411 may require a steering unit (e.g., steering unit 420 described below), e.g., other than suspension unit 410. In some embodiments, a wheel assembled into suspension unit 410 may be not steerable (e.g., without a need in a steering unit).

Figure 4F:
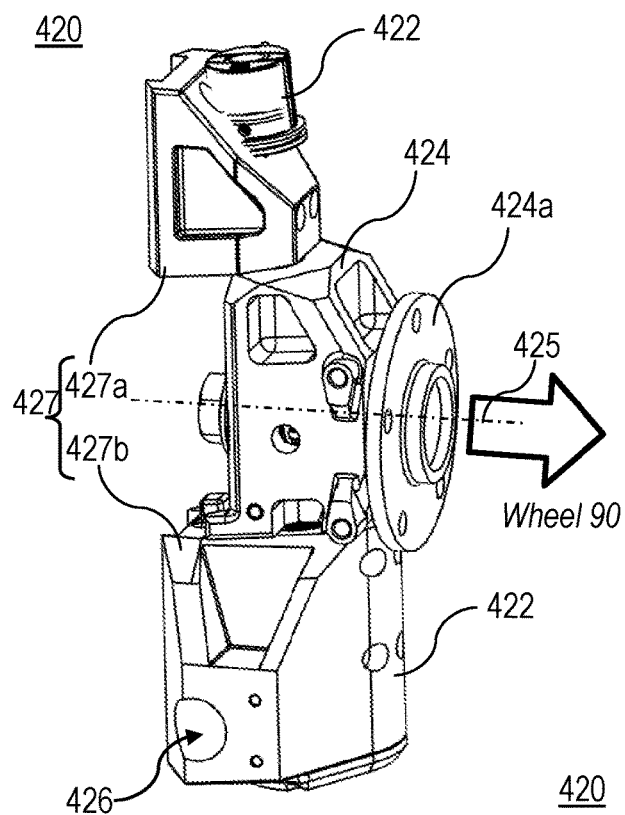
FIGS. 4F, 4G and 4H are schematic illustrations of a steering unit for an in-wheel system with suspension and steering capabilities, according to some embodiments of the invention.
Figure 4G:
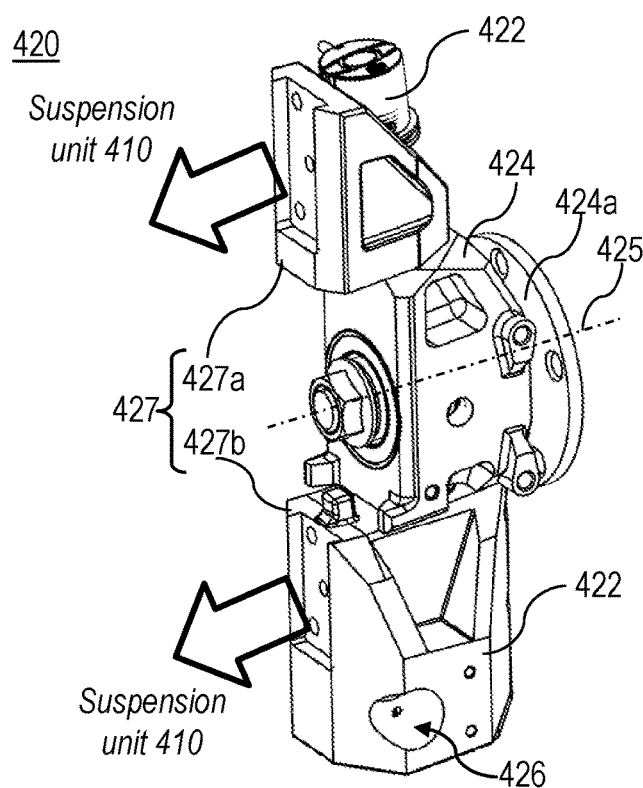
Figure 4H:
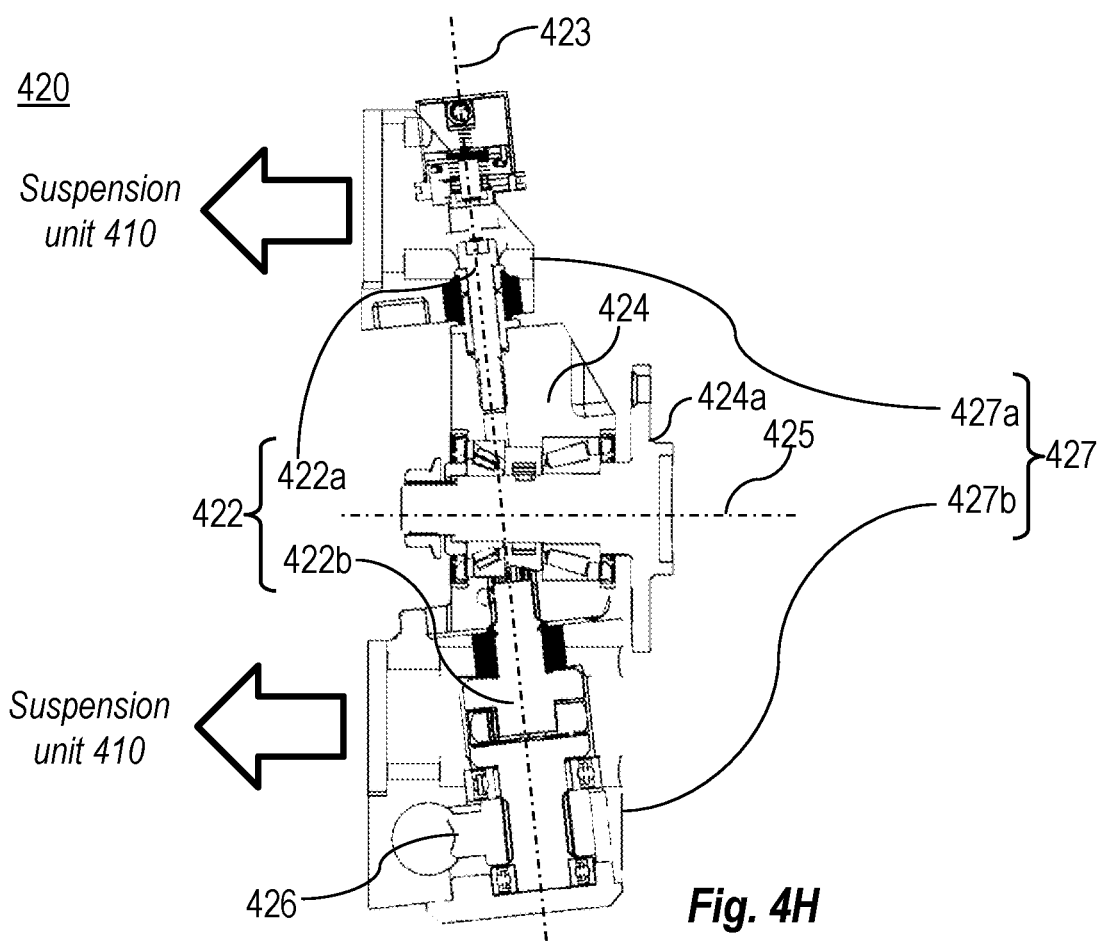
Figure 4I:
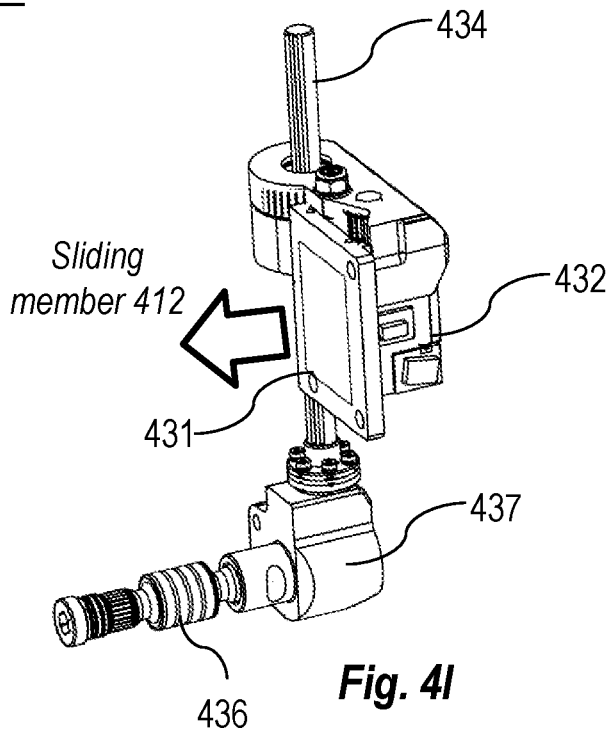
FIGS. 4I, 4J, 4K, 4L and 4M are schematic illustrations of a steering mechanism for an in-wheel system with suspension and steering capabilities, according to embodiments of the invention.
Figure 4K:
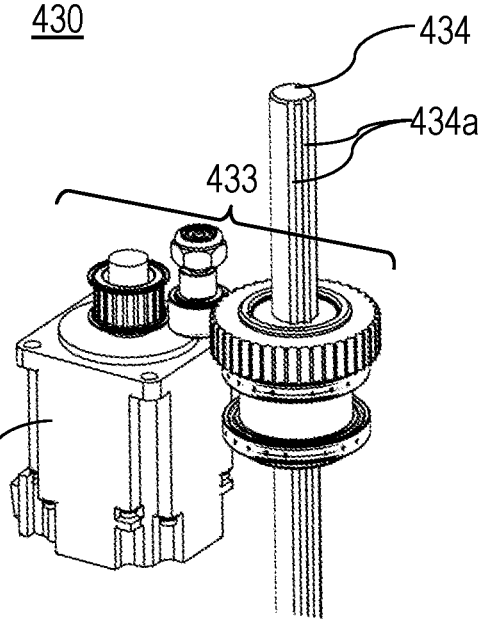
Figure 4J:
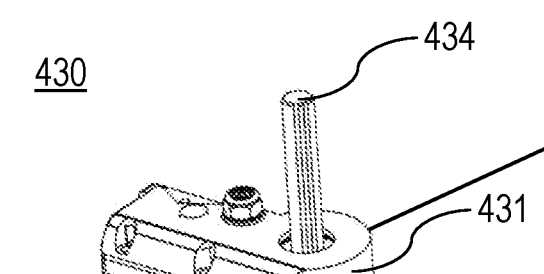
Figure 4L:
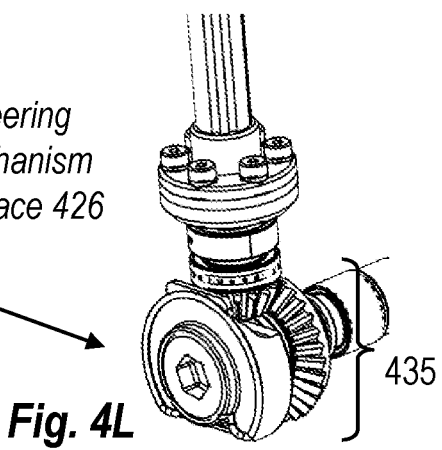
Figure 4M:
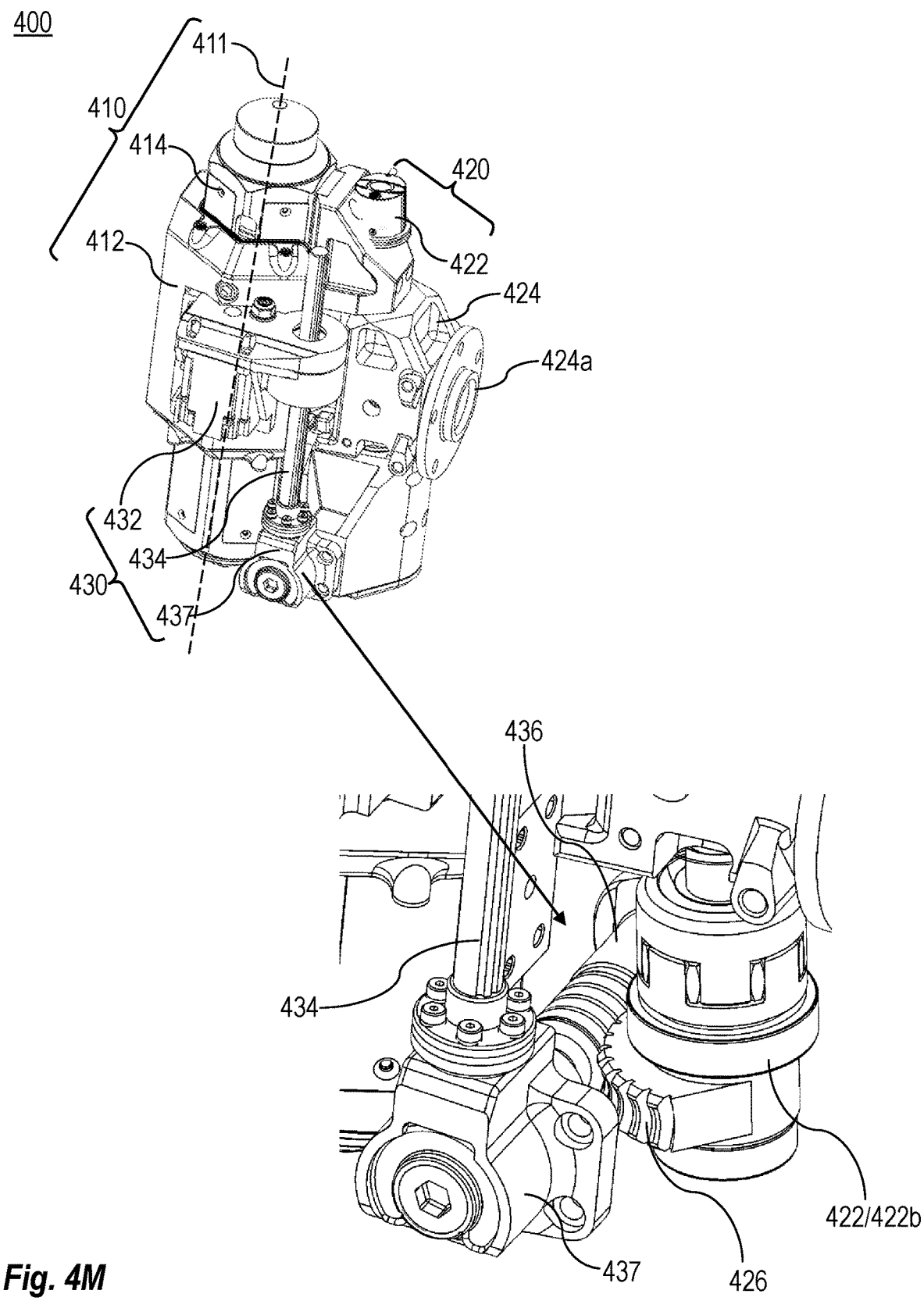

Reference is now made to FIGS. 4F, 4G and 4H, which are schematic illustrations of a steering unit 420 for a second embodiment of an in-wheel system 400 with suspension and steering capabilities, according to some embodiments of the invention.

FIGS. 4F and 4G show different perspective views and FIG. 4H shows a longitudinal cross-sectional view of steering unit 420.

In some embodiments, steering unit 420 may include pivoting members 422 and a steering mechanism interrace 426. For example, pivoting members 422 and steering mechanism interface 426 may be such as pivoting members 322 and steering mechanism interface 326, respectively, as described above with respect to FIGS. 3A, 3B and 3C.

In some embodiments, in-wheel system 400 may include a wheel interface 424. Wheel interface 424 may be adapted to rotatably support wheel 90 of the vehicle. For example, in-wheel system 400 may include a wheel hub 424a rotatably supported by wheel interface 424, wherein wheel hub 424a may be adapted to be connect to wheel 90 when wheel 90 is assembled into in-wheel system 400.

In some embodiments, pivoting members 422 may include a first pivoting member 424a and a second pivoting member 424b (e.g., as shown in FIG. 4H). Pivoting members 422 may define a steering axis 423 (e.g., imaginary axis) about which wheel interface 424 may turn to steer.

Pivoting members 422 may be connected to suspension unit 410. In some embodiments, pivoting members 422 may be pivotally supported within pivoting member supports 427, wherein pivoting members supports 427 may be connected to suspension unit 410. For example, first pivoting member 424a may be supported within a first pivoting member support 427a and second pivoting member 424b may be supported within a second pivoting member support 427b (e.g., as shown in FIG. 4H).

Wheel interface 424 may be connected to pivoting members 422 and may include a wheel hub 424a, wherein wheel hub 424a may be adapted to be connected to a wheel 90 of the vehicle. Wheel interface 424 may be adapted to be turned about steering axis 423 by pivoting members 422. Wheel interface 424 may enable a rotation of wheel hub 424a about an axis 425 that is perpendicular to longitudinal axis 411 of suspension unit 410. Longitudinal axis 411 not shown in FIGS. 4F-4H for sake of clarity.

Steering mechanism interface 426 may be connected to at least one of pivoting members 422. For example, steering mechanism interface 426 may be connected to second pivoting member 424b supported within second pivoting member support 427b (e.g., as shown in FIG. 4H). Steering mechanism interface 426 may be adapted to pivot/turn pivoting members 422 and thereby to turn wheel interface 424 connected thereto with respect to suspension unit 410 (e.g., with respect to rail 414) and about steering axis 423.

Steering axis 423 (e.g., imaginary steering axis) defined by pivoting members 420 of steering unit may be independent and/or separated from suspension unit 410 (or longitudinal axis 411 thereof). This may, for example, allow providing a wide range of possible inclinations of steering axis 423 with respect to a vertical axis of wheel 90 and/or allow adjusting of the inclination thereof according to predetermined specifications (e.g., scrub radius, caster angle, camber angle, etc.).

Reference is now made to FIGS. 4I, 4J, 4K, 4L and 4M, which are schematic illustrations of a steering mechanism 430 for an embodiment of an in-wheel system 400 with suspension and steering capabilities, according to embodiments of the invention.

In some embodiments, steering mechanism 430 may include a steering motor 432, a steering rod 434, and a worm gear 436.

In some embodiments, steering motor 432 may be connected to sliding member 412 of suspension unit 410. Since sliding member 412 may be, for example, a sprung mass, steering motor 432 may be subjected to less vibrations and/or shocks (as would be if connected to un-sprung mass, for example rail 414), which may contribute to safety, performance and life-time of motor 432 and the entire suspension system 400.

In some embodiments, steering rod 434 may be parallel to longitudinal axis 411 of suspension unit 410 and may be connected to steering motor 432 using, for example, a first gear assembly 433.

In some embodiments, steering mechanism 430 may include a housing 431. Housing 431 may be adapted to support and at least partly accommodate steering motor 431 and first gear assembly 433. Housing 431 may be connected to sliding member 412 of suspension unit 410.

Steering rod 434 and first gear assembly 433 may be adapted to enable sliding of first gear assembly 433 along steering rod 434 when sliding member 412 slides on rail 414, while transmitting rotational/turning motions generated by steering motor 432 to steering rod 434. For example, steering rod 434 may include one or more protrusions 434a on a lateral surface and along a length thereof and a gear of first gear assembly 433 that is connected to steering rod 434 may include corresponding indents. Protrusions 434a of steering rod 434 and the indents of the gear thereof may prevent relative rotation of the gear with respect to steering rod 434.

In some embodiments, worm gear 436 may be perpendicular to steering rod 434 and may be connected to steering rod 434 using, for example, a second gear assembly 435.

Second gear assembly 435 may transmit rotational/turning motions of steering rod 434 (e.g., transmitted thereto from steering motor 432 by first gearing assembly 433) to worm gear 436. In some embodiments, second gear assembly 435 and at least a portion of worm gear 436 may be accommodated within a second housing 437.

Worm gear 436 may be interfaceable with steering mechanism interface 426 connected to pivoting members 422 (e.g., to second pivoting member 424B) of steering unit 420. In embodiments of FIGS. 4I-4M, steering mechanism interface 426 of steering unit 426 may include a gear.

Accordingly, rotational/turning motions of worm gear 436 (e.g., transmitted thereto from steering rod 434 by second gearing assembly 435) may be transmitted to pivoting members 420 by steering mechanism interface 426, which in turn may result in turning of wheel interface 424 of steering unit 420 with respect to suspension unit 410 and about steering axis 423 defined by pivoting members 422 of steering unit 420 (e.g., as described above with respect to FIGS. 4F, 4G and 4H).

As steering rod 434 and first gear assembly 433 may be adapted to enable sliding of first gear assembly 433 on steering rod 434 while yet transmitting rotational/turning motions generated by steering motor 432 to steering rod 434 (e.g., as described above), both suspension unit 410 and steering unit 420 of suspension system 400 may operate simultaneously and independent from each other.

In some embodiments, steering rod 434 may be at least partially curved. This may, for example, provide an arcuate movement of first gear assembly 433 along steering rod 434 when sliding member 412 slides on rail 414. The arcuate movement thereof may, for example, allow a dynamic behavior of wheel 90, with an arcuate vertical travel thereof. In some embodiments, rail 414 may be arcuate (e.g., such as steering rod 434).

In some embodiments, a shock absorber may be mounted on rod 434. For example, the shock absorber may be mounted between first gear assembly 433 and second gear assembly 435. The shock absorber may reduce the load and/or shock impact between first gear assembly 433 and second gear assemblies 435. The shock absorber may keep a distance between the first gear assembly 433 and second gear assembly 435, for example, when steering unit 420 is at least partially disconnected of a suspension unit 410. In some embodiments, the shock absorber may be a longitudinal resilient sleeve. In some embodiments, the shock absorber may be a longitudinal spring. In some embodiments, the shock absorber may be pre-loaded.

In various embodiments, worm gear 436 and/or steering mechanism interface 426 may be adapted to form a self-locking gear mechanism (e.g., based on a type and a transmission ratio of worm gear 436—steering mechanism interface 426 complex). In other embodiments, second gear assembly 435 may include a gear-unlock assembly. The gear-unlock assembly may disable self-locking of steering mechanism 430. In some embodiments, the gear-unlock assembly may include one or more of: bearing, clutch, and ratchet like gears.

In some embodiments, steering mechanism 430 may be a steering-by-wire unit (e.g., capable of being controlled by electronical means).

It is noted that other embodiments of steering mechanism 430 may be used.

In some embodiments, steering mechanism 430 may include a belt drive, a direct drive, a chain drive or any suitable type of gear (e.g. planetary/worm/bevel/helical/etc.) instead of worm gear 436. The actuator that provides the steering force may be an electric motor, a hydraulic motor, a pneumatic motor, torque produced by another torque source and that is transferred to the steering assembly. In some embodiments the steering torque may be received from the steering wheel via, for example, steering rack.

Reference is now made to FIGS. 5A, 5B, 5C, 5D, 5E and 5F, which are schematic illustrations of an embodiment of an in-wheel system 400 with suspension and steering capabilities and of a wheel 90 assembled into in-wheel system 400, according to some embodiments of the invention.

Figure 5A:
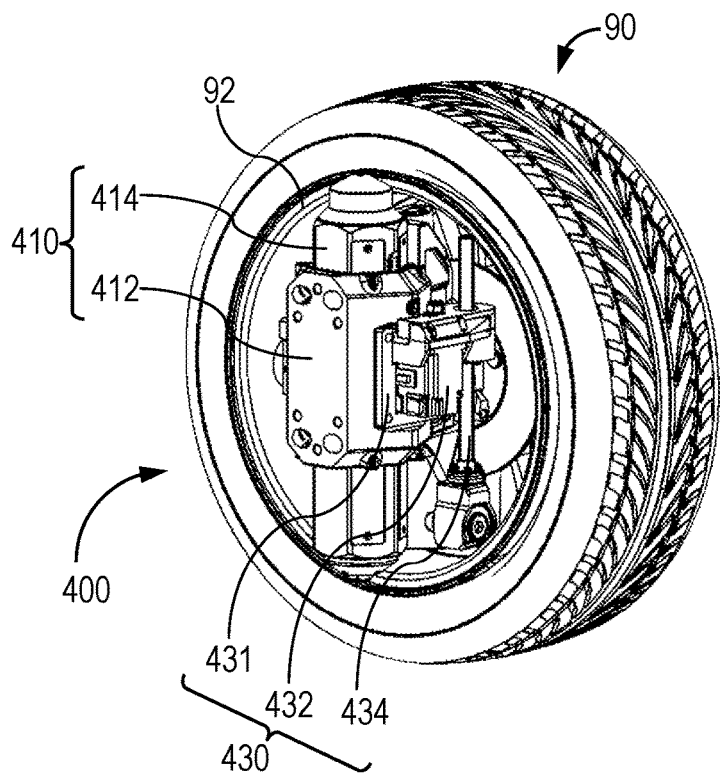
FIGS. 5A, 5B, 5C, 5D, 5E and 5F are schematic illustrations of an in-wheel system with suspension and steering capabilities and of a wheel assembled into in-wheel system, according to some embodiments of the invention.

FIG. 5A shows a perspective view of system 400 and wheel 90.

Figure 5B:
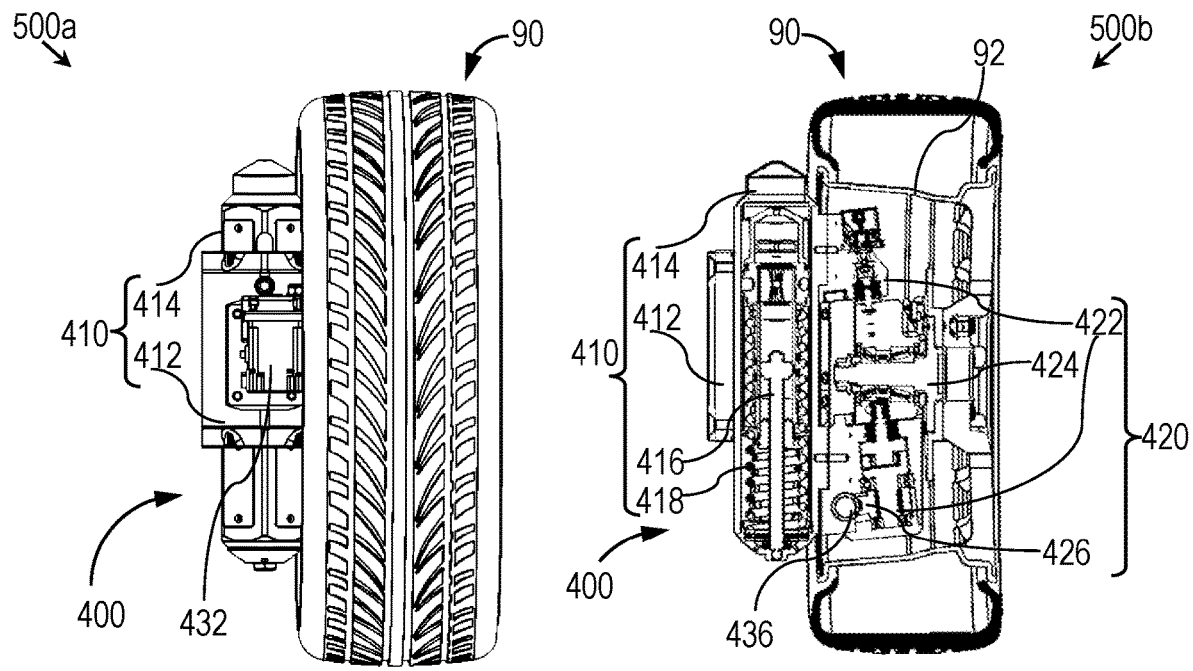

Illustrations 500a and 500b in FIG. 5B show front view and longitudinal cross-sectional view, respectively, of system 400 and wheel 90.

Figure 5C:
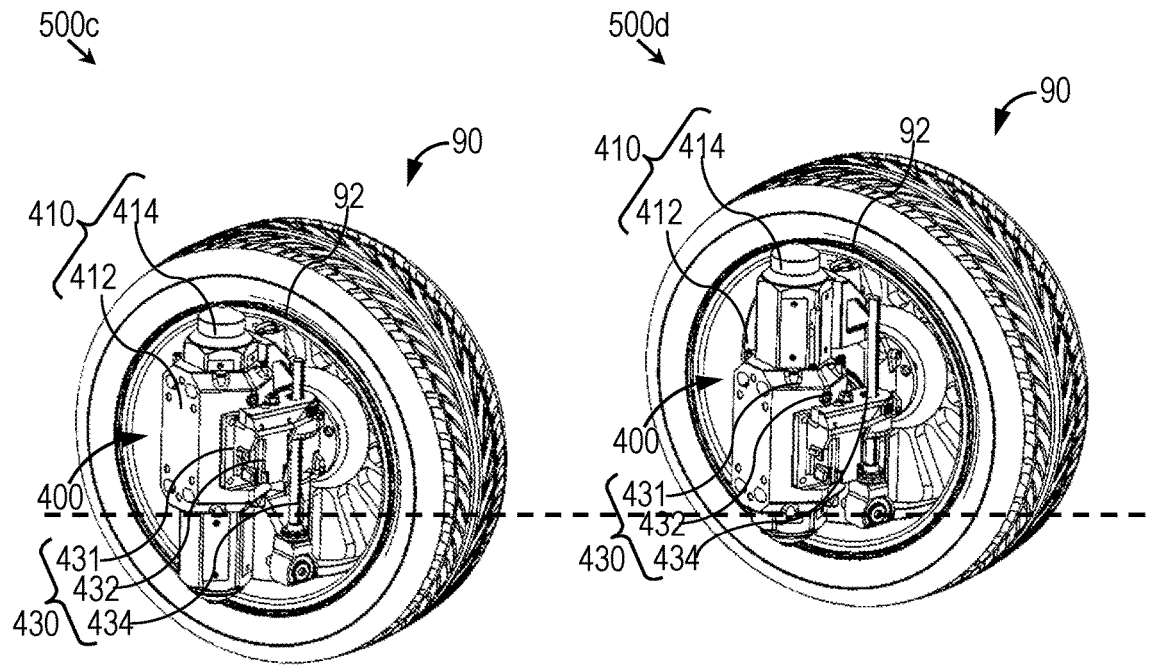

FIG. 5C shows perspective views of system 400 and wheel 90. Illustrations 500c and 500d in FIG. 5C show suspension unit 410 in uncompressed and compressed states, respectively.

Figure 5D:
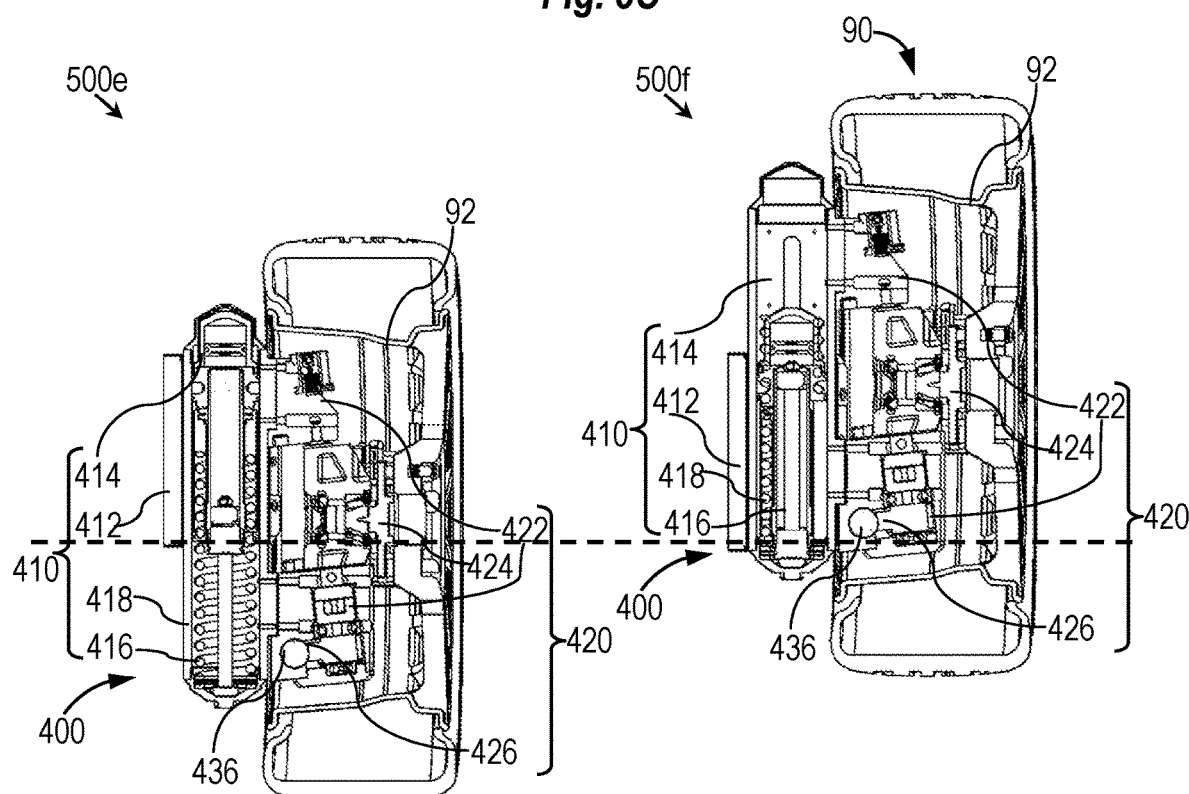

FIG. 5D shows front cross-sectional views of system 400 and wheel 90. Illustrations 500e and 500f in FIG. 5D show suspension unit 410 in uncompressed and compressed states, respectively.

Figure 5E:
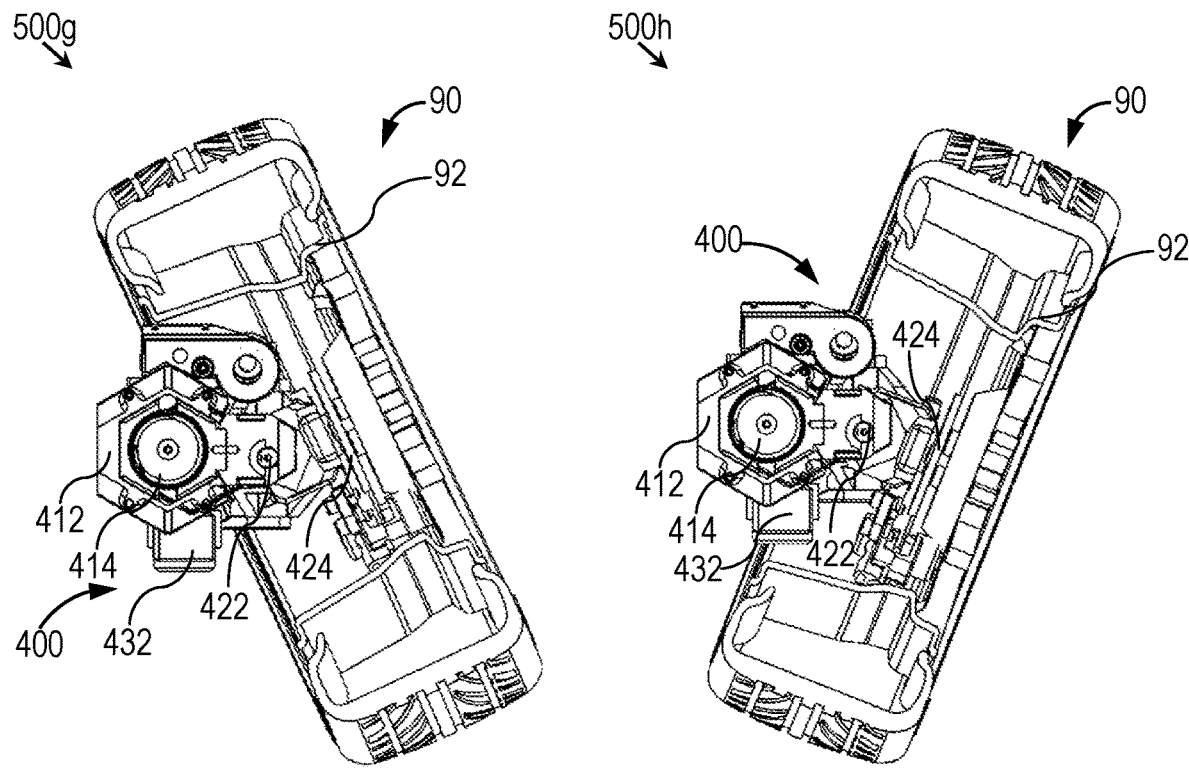

FIG. 5E shows transverse cross-sectional views of system 400 and right wheel 90 of the vehicle. Illustration 500g and 500h show left turn and right turn of system 400 and wheel 90, respectively.

Figure 5F:
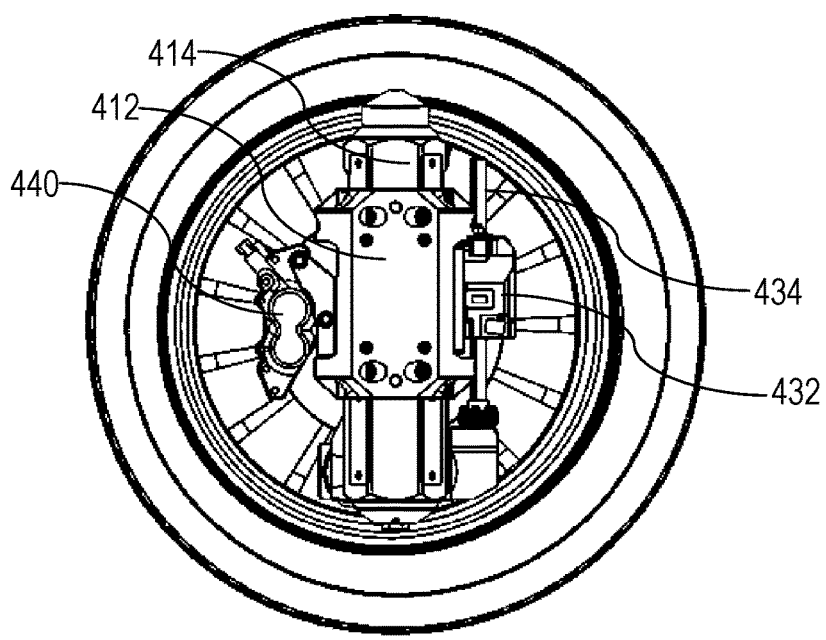

FIG. 5F shows a side view of system 400 and wheel 90.

In some embodiments, suspension system 400 may be designed such that most of the system is adapted to be located within rim 92 of wheel 90.

For example, steering unit 420, at least a portion of suspension unit 410 and most elements of steering mechanism 430 may be adapted to be located within rim 92 of wheel 90, while only some portion of suspension unit 410 and steering motor 432 of steering mechanism 430 may be located external and adjacent to rim 92. For example, 90%-100% of a volume of steering unit 420 and/or 70%-100% of a volume of steering mechanism 430 may be locate within rim 92 of wheel 90.

In some embodiments, suspension system 400 may include a braking unit 440 (e.g., as shown in FIG. 5F). In some embodiments, braking unit 440 may be brake-by-wire unit (e.g., capable of being controlled by electronical means).

In some embodiments, braking unit 440 may include a brake actuator. The brake actuator may be coupled to, for example, wheel interface 424. In some embodiments, braking unit 440 may include one or more additional brake modules. The additional brake module(s) may, for example, include a brake controller and/or brake fluid reservoir. The brake fluid reservoir may be, for example, coupled to an outer surface of sliding member 412 of suspension unit 410. For example, at least one outer surface of sliding member 412 may be flat and configured to enable connection of, for example, the brake fluid reservoir thereto.

Advantageously, adapting the entire steering unit 420 and most of steering mechanism 430 to be located within rim 92 of wheel 90 may enable to significantly reduce the space occupied by the system as compared to current suspension and steering systems used nowadays in most of vehicles and thus may, for example, allow to significantly reduce the size of the passengers' compartment of the vehicle.

Furthermore, connecting rail 414 to wheel 90 (e.g., which is an un-sprung mass) and sliding element 412 to reference frame 80 of the vehicle (e.g., which is a sprung mass) may enable to maximize a travel of sliding member 412 along rail 414 and thereby, for example, to minimize forces transferred to reference frame 80 of the vehicle and to maximize a comfort of the passengers in the vehicle (e.g., as described above with respect to FIGS. 5A, 5B and 5C and FIGS. 4B, 4C, 4D and 4E). Limiting the protrusion of suspension unit 410 from rim 92 of wheel may yet allow to keep suspension system 400 compact (as compared to current suspension and steering systems).

Furthermore, separating steering unit 420 from suspension unit 410 may allow to provide a wide range of possible inclinations of steering axis 423 (defined by pivoting members 422 of steering unit 420) with respect to a vertical axis of wheel 90 and/or allow to adjust the inclinations thereof according to predetermined specifications (e.g., scrub radius, caster angle, camber angle, etc.)—e.g., as described above with respect to FIGS. 4F, 4G and 4H.

Furthermore, suspension unit 410 of suspension system 400 may withstand higher lateral forces as compared to current suspension units, for example due to specific shapes of transverse cross-sectional profiles thereof (e.g., as described above with respect to FIGS. 4B, 4C, 4D and 4E).

Furthermore, some embodiments of suspensions system 400 may take advantages of drive-by-wire technology (e.g., steer-by-wire steering mechanism 430 as described above with respect to FIGS. 4I, 4J, 4K, 4L, 4M and brake-by-wire braking unit 440 as described above with respect to FIG. 5F)

Figure 6A:
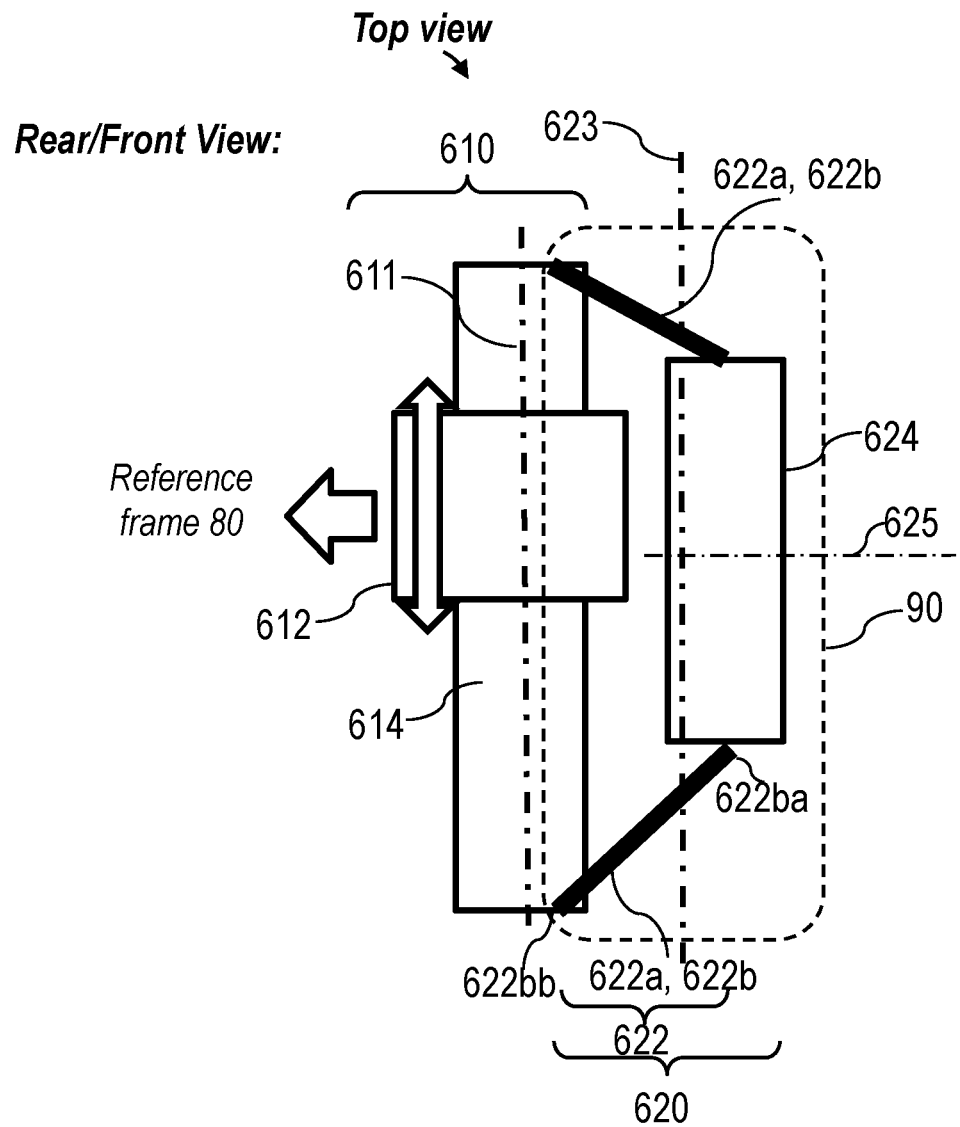
FIGS. 6A, 6B and 6C are schematic illustrations of an embodiment of an in-wheel system with suspension and steering capabilities and of a wheel assembled into in-wheel system, according to some embodiments of the invention.
Figure 6B:
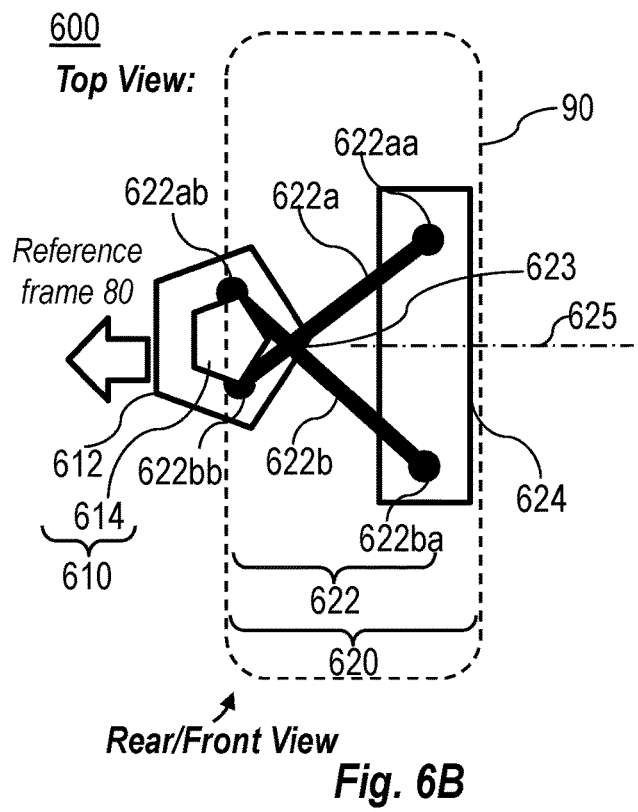
Figure 6C:
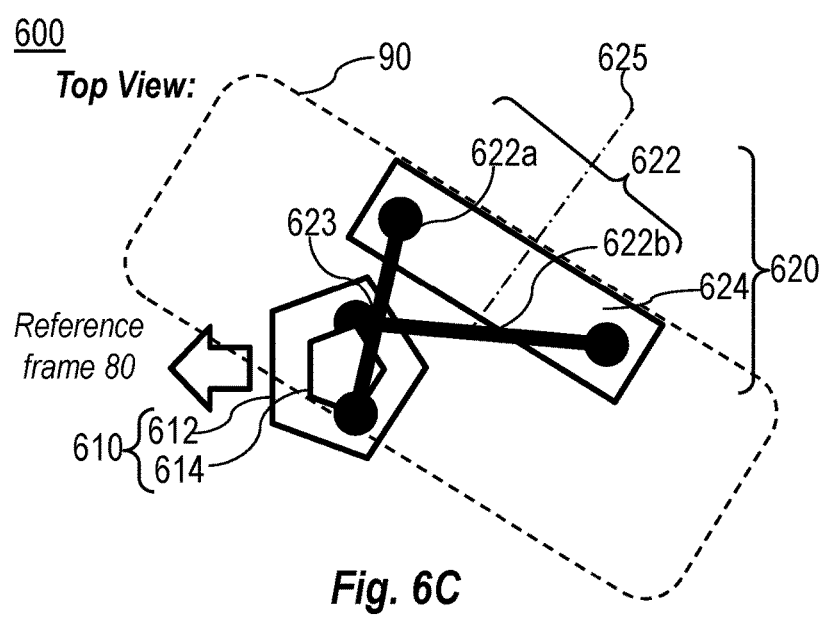

Reference is now made to FIGS. 6A, 6B and 6C, which are schematic illustrations of embodiments of in-wheel system 600 with suspension and steering capabilities and of a wheel 90 assembled into in-wheel system 600, according to some embodiments of the invention.

In-wheel system 600 may include a suspension unit 610. Suspension unit 610 may be similar to suspension unit 110, 210, 310 and 410 described hereinabove. In some embodiments, suspension unit 610 may include a sliding member 612, a rail 614 and a shock absorption and springing means. For example, the shock absorption and springing means may be disposed in rail 614 (e.g., as described hereinabove).

In some embodiments, suspension unit 610 may be adapted to be connected to reference frame 80 such that longitudinal axis 611 of suspension unit 610 is perpendicular (or substantially perpendicular) to the ground surface/road on which the wheel may turn (e.g., such that longitudinal axis 611 is parallel or substantially parallel to the vertical axis of the vehicle). A longitudinal axis of rail 614 may coincide with longitudinal axis 611 of suspension unit 610. In some embodiments, suspension unit 610 may be adapted to be connected to reference frame 80 such that longitudinal axis 611 of suspension unit 610 is perpendicular (or substantially perpendicular) to a wheel/wheel hub rotation axis (e.g., an axis 625) about which wheel 90 may rotate when wheel 90 is assembled into in-wheel system 600.

In some embodiments, sliding member 612 may be adapted to be connected to reference frame 80 of the vehicle and rail 614 may be adapted to be connected to wheel 90 (e.g., as shown in FIGS. 6A, 6B and 6C).

In-wheel system 600 may include a steering unit 620. In some embodiments, steering unit 620 may include at least one pair of arms 622. In some embodiments, in-wheel system 600 may include a wheel interface 624.

In some embodiments, rail 614 may be adapted to be connected to wheel 90 by coupling at least one pair of arms 622 to wheel interface 624. Pair of arms 622 may include a first arm 622a having a first end 622aa and a second end 622ab and a second arm 622b having a first end 622ba and a second end 622bb. First end 622aa of first arm 622a and first end 622ba of second arm 622b may be rotatably connected to wheel interface 624. Second end 622*ab* of first arm 622*a* and second end 622*bb* of second arm 622*b* may be adapted to be rotatably connected to suspension unit 610. In some embodiments, first arm 622*a* and second arm 622*b* may be pivotally connected to rail 612 of suspension unit 610 (e.g., as shown in FIGS. 6A, 6B and 6C).

In some embodiments, first arm 622*a* and second arm 622*b* may be set across each other and define a dynamic steering axis 623 (e.g., virtual dynamic steering axis) at a virtual intersection therebetween such that dynamic steering axis 623 may move with respect to suspension unit 610 when wheel interface 624 changes its steering angle relative to suspension unit 610 (e.g., as shown in FIG. 6C). In general, the movement of dynamic steering axis 623 may be dictated by the length of first arm 622*a* and second arm 622*b* and the location of the rotatable connections of first arm 622*a* and second arm 622*b* to suspension unit 610 and/or wheel interface 624. In this manner, the protrusion of wheel 90 into a cabin of the vehicle may be significantly reduced as compared to suspension systems having stationary steering axis.

Figure 7A:
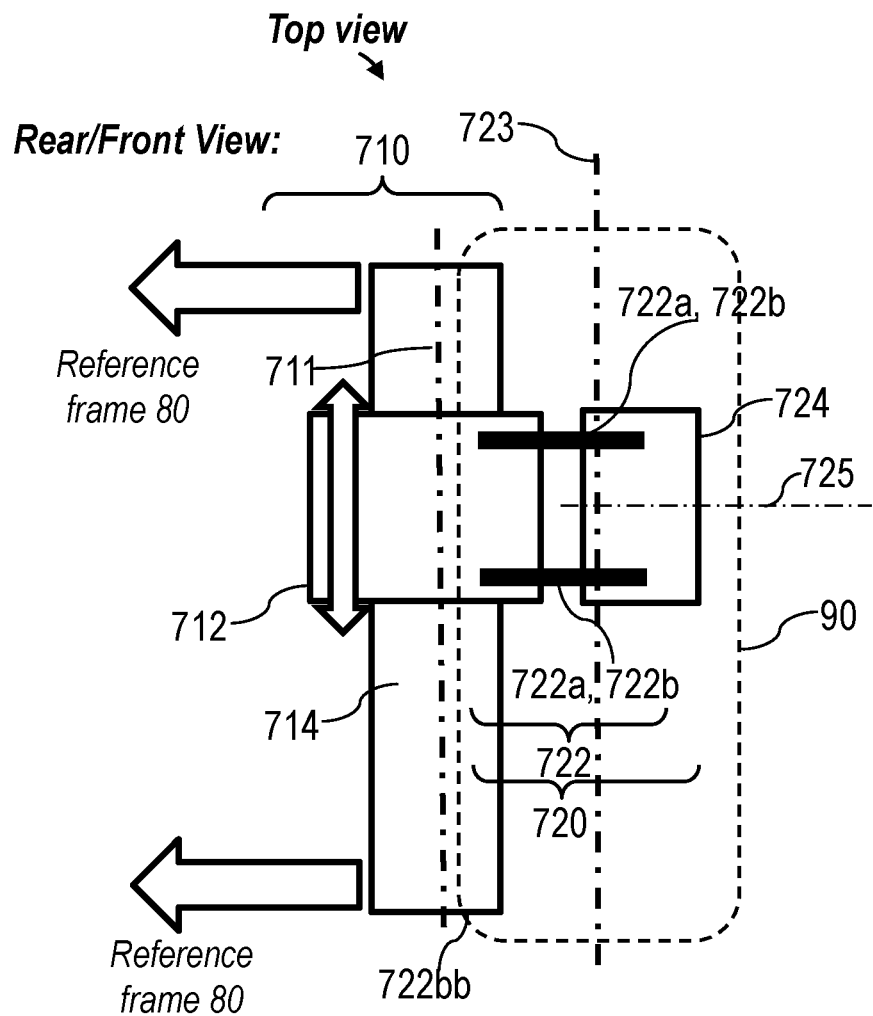
FIGS. 7A, 7B and 7C are schematic illustrations of an embodiment of an in-wheel system with suspension and steering capabilities and of a wheel assembled into in-wheel system, according to some embodiments of the invention.
Figure 7B:
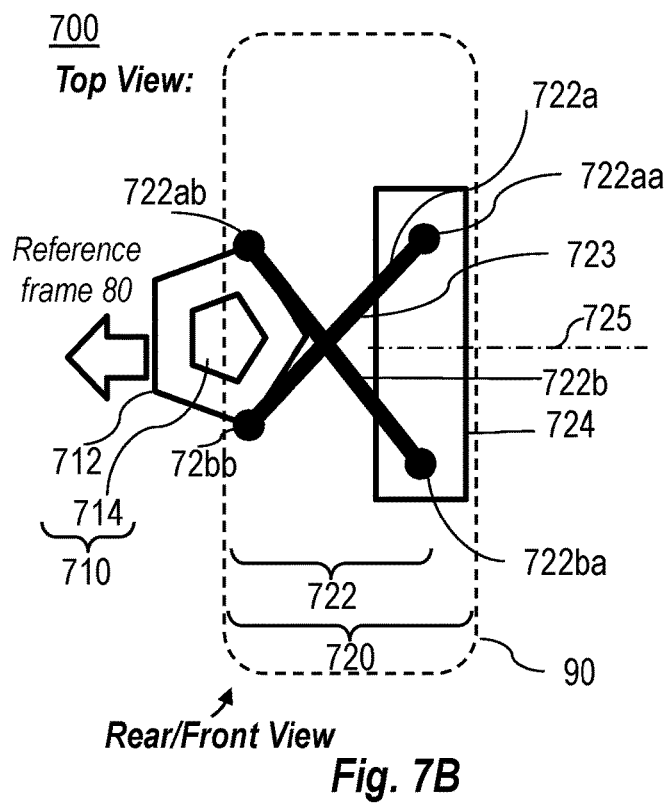
Figure 7C:
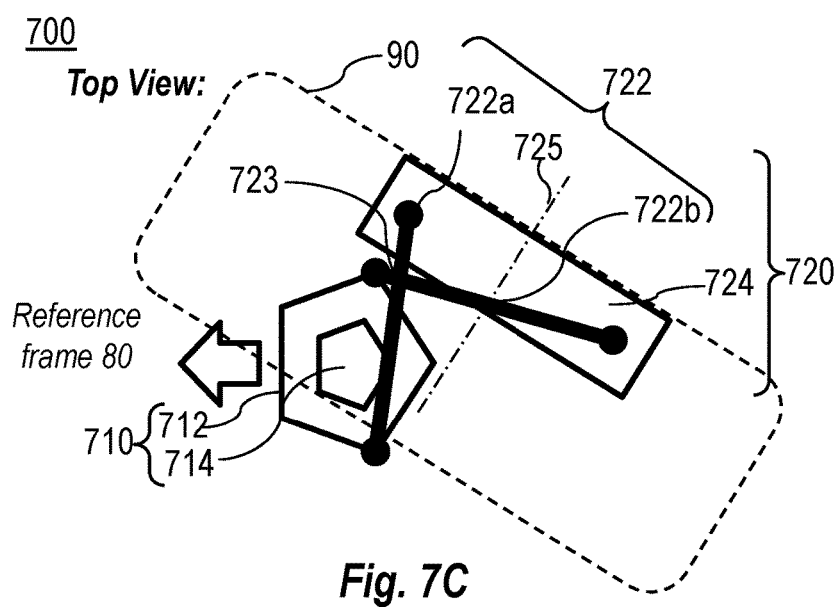

Reference is now made to FIGS. 7A, 7B and 7C, which are schematic illustrations of embodiments of in-wheel system 700 with suspension and steering capabilities and of a wheel 90 assembled into in-wheel system 700, according to some embodiments of the invention.

In-wheel system 700 may include a suspension unit 710. Suspension unit 710 may be similar to suspension unit 110, 210, 310, 410 and 610 described hereinabove. In some embodiments, suspension unit 710 may include a sliding member 712, a rail 714 and a shock absorption and springing means. For example, the shock absorption and springing means may be disposed in rail 714 (e.g., as described hereinabove).

In some embodiments, suspension unit 710 may be adapted to be connected to reference frame 80 such that longitudinal axis 711 of suspension unit 710 is perpendicular (or substantially perpendicular) to the ground surface/road on which the wheel may turn (e.g., such that longitudinal axis 711 is parallel or substantially parallel to the vertical axis of the vehicle). A longitudinal axis of rail 714 may coincide with longitudinal axis 711 of suspension unit 710. In some embodiments, suspension unit 710 may be adapted to be connected to reference frame 80 such that longitudinal axis 711 of suspension unit 710 is perpendicular (or substantially perpendicular) to a wheel/wheel hub rotation axis (e.g., an axis 725) about which wheel 90 may rotate when wheel 90 is assembled into in-wheel system 700.

In some embodiments, rail 714 may be adapted to be connected to reference frame 80 of the vehicle and sliding member 712 may be adapted to be connected to wheel 90 (e.g., as shown in FIGS. 7A, 7B and 7C).

In-wheel system 700 may include a steering unit 720. In some embodiments, steering unit 720 may include at least one pair of arms 722. In some embodiments, in-wheel systems 700 may include a wheel interface 724.

In some embodiments, sliding member 712 may be adapted to be connected to wheel 90 by coupling at least one pair of arms 722 to wheel interface 724. Pair of arms 722 may include a first arm 722*a* having a first end 722*aa* and a second end 722*ab* and a second arm 722*b* having a first end 722*ba* and a second end 722*bb*. First end 722*aa* of first arm 722*a* and first end 722*ba* of second arm 722*b* may be rotatably connected to wheel interface 724. Second end 722*ab* of first arm 722*a* and second end 722*bb* of second arm 722*b* may be adapted to be rotatably connected to suspension unit 710. In some embodiments, such as in system 700, first arm 722*a* and second arm 722*b* may be pivotally connected to sliding member 714 of suspension unit 710 (e.g., as shown in FIGS. 7A, 7B and 7C).

In some embodiments, first arm 722*a* and second arm 722*b* may be set across each other and define a dynamic steering axis 723 (e.g., virtual dynamic steering axis) at a virtual intersection therebetween such that dynamic steering axis 723 may move with respect to suspension unit 710 when wheel interface 724 changes its steering angle relative to suspension unit 710 (e.g., as shown in FIG. 7C). In general, the movement of dynamic steering axis 723 may be dictated by the length of first arm 722*a* and second arm 722*b* and the location of the rotatable connections of first arm 722*a* and second arm 722*b* to suspension unit 710 and/or wheel interface 724. In this manner, the protrusion of wheel 90 into a cabin of the vehicle may be significantly reduced as compared to suspension systems having stationary steering axis.

Figure 8:
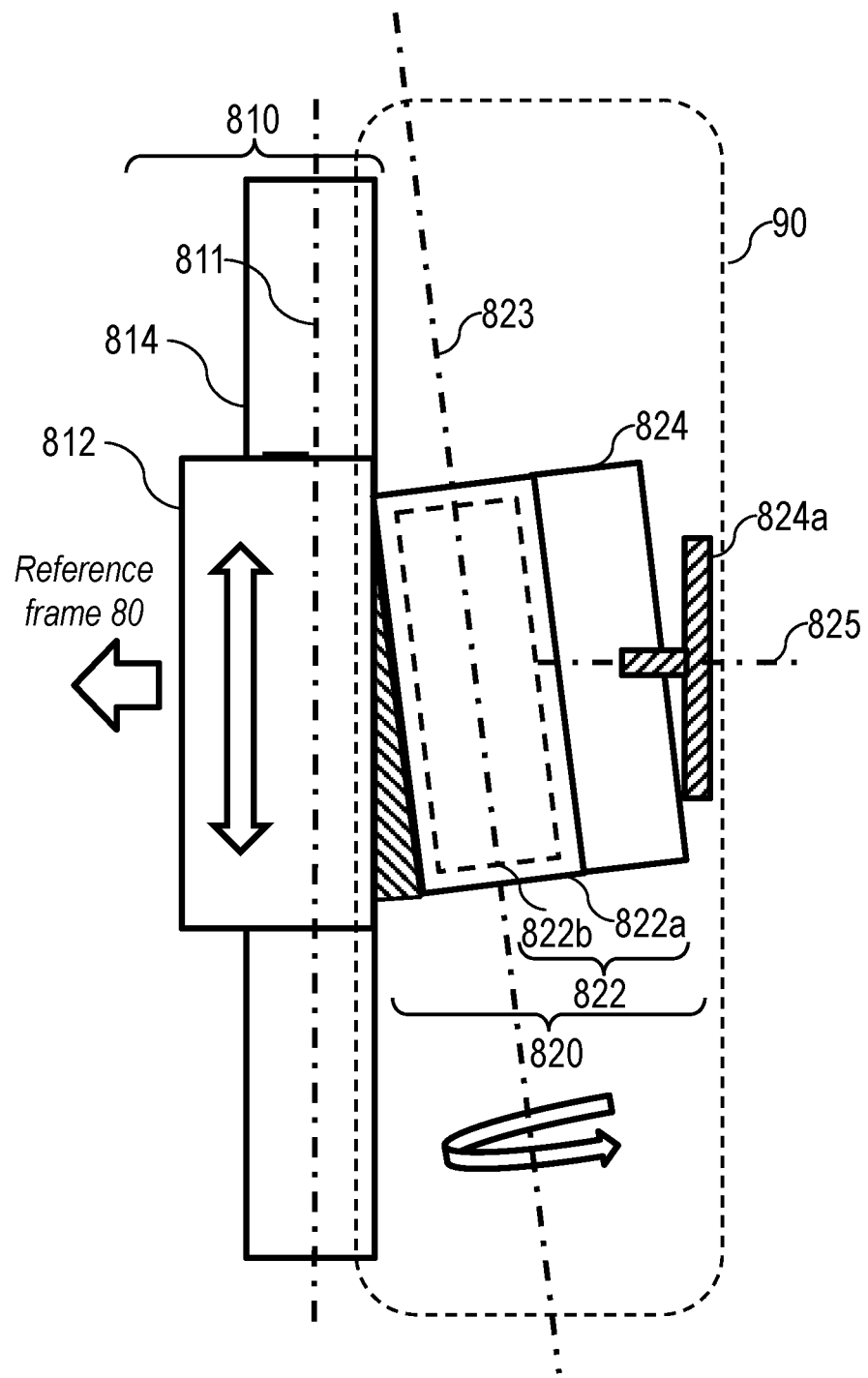
FIG. 8 is a schematic illustration of an embodiment of an in-wheel system with suspension and steering capabilities and of a wheel assembled into in-wheel system, according to some embodiments of the invention.

Reference is now made to FIG. 8, which is a schematic illustration of an embodiment of an in-wheel system 800 with suspension and steering capabilities and of a wheel 90 assembled into in-wheel system 800, according to some embodiments of the invention.

In-wheel system 800 may include a suspension unit 810. Suspension unit 810 may be similar to suspension unit 110, 210, 310, 410, 610 and 710 described hereinabove. In some embodiments, suspension unit 810 may include a sliding member 812, a rail 814 and a shock absorption and springing means. For example, the shock absorption and springing means may be disposed in rail 814 (e.g., as described hereinabove).

In some embodiments, suspension unit 810 may be adapted to be connected to reference frame 80 such that longitudinal axis 811 of suspension unit 810 is perpendicular (or substantially perpendicular) to the ground surface/road on which the wheel may turn (e.g., such that longitudinal axis 811 is parallel or substantially parallel to the vertical axis of the vehicle). A longitudinal axis of rail 814 may coincide with longitudinal axis 811 of suspension unit 810. In some embodiments, suspension unit 810 may be adapted to be connected to reference frame 80 such that longitudinal axis 811 of suspension unit 810 is perpendicular (or substantially perpendicular) to a wheel/wheel hub rotation axis (e.g., an axis 825) about which wheel 90 may rotate when wheel 90 is assembled into in-wheel system 800.

In some embodiments, sliding member 812 may be adapted to be connected to reference frame 80 of the vehicle and rail 814 may be adapted to be connected to wheel 90 (e.g., as shown in FIG. 8). In some embodiments, rail 814 may be adapted to be connected to reference frame 80 of the vehicle and sliding member 812 may be adapted to be connected to wheel 90.

In-wheel system 800 may include a steering unit 820. In some embodiments, steering unit 820 may include a frameless motor 822. In some embodiments, in-wheel system 800 may include a wheel interface 824 (and optionally a wheel hub 824*a*).

In some embodiments, frameless motor 822 may be coupled to sliding member 812 of suspension unit 810 and to wheel interface 824 of steering unit 820. In some embodiments, frameless motor 822 may be disposed between sliding member 812 of suspension unit 810 and wheel interface 824 of steering unit 820. For example, a stator 822*a* of frameless motor 822 may be connected to sliding member 812 and wheel interface 824. Rotation of stator 822*a* may rotate wheel interface 824 with respect to sliding member 812 of suspension unit 810. In some embodiments, a steering axis 823 defined by steering unit 820 may coincide with the rotation axis of a rotor 822b of frameless motor 822.

Some embodiments of the present invention may provide one of: a suspension unit (e.g., such as suspension unit 110, 210 described hereinabove) and an in-wheel system (e.g., such as in-wheel system 300, 400, 600, 700 and 800 described hereinabove), and a wheel assembled therein.

Various embodiments of the present invention may provide a vehicle including two or more suspension unit (e.g., such as suspension units 110, 210 described hereinabove) or two or more in-wheel systems (e.g., such as in-wheel systems 100, 300, 400, 600, 700, and 800 described hereinabove). In some embodiments, the vehicle may include two or more wheels 90 assembled into the two or more suspension units or the two or more in-wheel systems. The vehicle may, for example, be a passenger car, a commercial vehicle, a sport utility vehicle, an electrical car, a van, etc.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A sliding pillar suspension unit, comprising:
a rail having a hollow chamber and a longitudinal axis;
a sliding member slidably connected to the rail;
shock absorption and springing means disposed within the hollow chamber of the rail and connected at a first end to the rail and connected at a second end to the sliding member, the shock absorption and springing means to damp motions and support forces along the longitudinal axis of the rail; and
roller bearings within cavities on at least some of inner lateral surfaces of the sliding member,
wherein the rail and the sliding member having transverse cross-sectional profiles that prevent a rotational movement of the sliding member with respect to the rail about the longitudinal axis of the rail.

2. The suspension unit of claim 1, wherein at least a portion of the traverse cross-sectional profiles of the rail and the sliding member is a polygonal.

3. The suspension system of claim 1, wherein at least a portion of the traverse cross-sectional profiles of the rail and the sliding member is asymmetric about longitudinal axes thereof.

4. The suspension unit of claim 1, comprising bearing adjusting pins screwable into the cavities, wherein a shape and a measure of screwing of the bearing adjusting pins into the cavities dictate at least one of a position and an alignment of the roller bearings within the cavities.

5. The suspension unit of claim 1, wherein the shock absorption and springing means comprise a spring-loaded shock absorber.

6. The suspension of claim 5, wherein the spring-loaded shock absorber is disposed within the rail.

7. The suspension unit of claim 6,
wherein the rail comprises one or more slots disposed on one or more lateral surfaces of the rail, and
wherein the spring-loaded shock absorber is connected at its first end to the rail and connected at its second to the sliding member using one or more pins, each of the one or more pins being adapted to slide within one of the one or more slots on the one or more lateral surfaces of the rail.

8. The suspension unit of claim 1, wherein the shock absorption and springing means are due to a magnetic force generatable between the sliding member and the rail.

9. The suspension unit of claim 1, wherein the shock absorption and springing means has a longitudinal axis, which is substantially parallel to the longitudinal axis of the rail.

10. The suspension unit of claim 1, wherein the shock absorption and springing means is located between the rail and the sliding member.

11. The suspension unit of claim 9, wherein the longitudinal axis of the shock absorption and springing means substantially coincides with the longitudinal axis of the rail.

12. The suspension unit of claim 1, wherein the rail is connectable to a wheel of a vehicle and the sliding member is connectable to a reference frame of a vehicle.

13. The suspension unit of claim 1, wherein the rail is connectable to a reference frame of a vehicle and the sliding member is connectable to a wheel of a vehicle.

14. The suspension unit of claim 1, wherein the rail is a sprung mass.

15. The suspension unit of claim 1, wherein the sliding member is a sprung mass.

16. The suspension unit of claim 1, wherein at least a portion of at least one of the rail and the sliding member are accommodatable within a rim of a wheel when a wheel is assembled into the suspension unit.

17. A sliding pillar suspension unit, comprising:
a rail having a hollow chamber and a longitudinal axis;
a sliding member slidably connected to the rail; and
shock absorption and springing means disposed within the hollow chamber of the rail and connected at its first end to the rail and connected at its second end to the sliding member, the shock absorption and springing means to damp motions and support forces along the longitudinal axis of the rail;

wherein the rail and the sliding member having transverse cross-sectional profiles that prevent a rotational movement of the sliding member with respect to the rail about the longitudinal axis of the rail, wherein the longitudinal axis of the rail is curved and the sliding member slidable on the rail along the curved longitudinal axis.

18. The suspension system of claim 17, wherein at least a portion of the traverse cross-sectional profiles of the rail and the sliding member are asymmetric about longitudinal axes thereof.

19. The suspension unit of claim 17, wherein the rail is i) connectable to a wheel of a vehicle and the sliding member is connectable to a reference frame of a vehicle, or ii) the rail is connectable to a reference frame of a vehicle and the sliding member is connectable to a wheel of a vehicle.

* * * * *